(12) United States Patent
Berliner et al.

(10) Patent No.: US 11,588,533 B2
(45) Date of Patent: Feb. 21, 2023

(54) SYSTEM AND METHOD FOR IMPROVING BEAM MANAGEMENT PROCEDURES

(71) Applicant: QUALCOMM Incorporated, San Diego, CA (US)

(72) Inventors: Ran Berliner, Kfar-Aviv (IL); Shay Landis, Hod Hasharon (IL); Yehonatan Dallal, Kfar Saba (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 17/147,077

(22) Filed: Jan. 12, 2021

(65) Prior Publication Data

US 2022/0224392 A1   Jul. 14, 2022

(51) Int. Cl.
*H04B 7/06* (2006.01)
*H04B 17/318* (2015.01)
(Continued)

(52) U.S. Cl.
CPC ......... *H04B 7/0695* (2013.01); *H04B 7/0417* (2013.01); *H04B 17/318* (2015.01);
(Continued)

(58) Field of Classification Search
CPC .. H04B 7/0695; H04B 17/318; H04B 7/0417; H04W 24/10; H04W 72/042;
(Continued)

(56) References Cited

U.S. PATENT DOCUMENTS

2017/0006594 A1* 1/2017 Wei .................... H04W 72/1242
2017/0303263 A1* 10/2017 Islam .................. H04B 7/0639
(Continued)

FOREIGN PATENT DOCUMENTS

EP    3499743 A1 *   6/2019   ........... H04B 7/0408

OTHER PUBLICATIONS

Ericsson: "Performance of Beam Management without Beam Indication", 3GPP TSG-RAN WG1 NR Ad Hoc #3, 3GPP Draft, R1-1716366 Performance of Beam Management Without Beam Indication, 3rd Generation Partnership Project (3GPP), Mobile Competence Centre, 650, Route Des Lucioles, F-06921 Sophia-Antipolis, vol. RAN WG1, No. Nagoya, Japan, Sep. 18, 2017-Sep. 21, 2017, Sep. 12, 2017 (Sep. 12, 2017), XP051329955, Retrieved from the Internet: URL: http://www.3gpp.org/ftp/tsg_ran/WG1_RL1/TSGR1_AH/NR_AH_1709/Docs/ [retrieved on Sep. 12, 2017] chapter 2.2, p. 5, pp. 3,4,6, figure 1.
(Continued)

*Primary Examiner* — Mewale A Ambaye
(74) *Attorney, Agent, or Firm* — Loza & Loza, LLP/QUALCOMM Incorporated

(57) ABSTRACT

Aspects of the disclosure relate to beam management techniques in a wireless communication system. A UE establishes a communication link with a base station and receives a set of transmit beams transmitted via a plurality of symbols in a sequential manner, wherein a respective transmit beam is transmitted in a respective symbol of the plurality of symbols. The UE measures, for each transmit beam in the set of transmit beams, a set of signal strengths corresponding to the respective transmit beam using a plurality of receive beams in the respective symbol, wherein a respective signal strength is measured based on a respective receive beam. The UE then sends a feedback message to the base station including at least an identification of a transmit beam having a highest measured signal strength among all sets of signal strengths measured for the set of transmit beams and the highest measured signal strength.

35 Claims, 10 Drawing Sheets

(51) Int. Cl.
  *H04B 7/0417*   (2017.01)
  *H04W 24/10*    (2009.01)
  *H04W 72/04*    (2023.01)
  *H04W 72/044*   (2023.01)
  *H04W 80/02*    (2009.01)

(52) U.S. Cl.
  CPC ......... *H04W 24/10* (2013.01); *H04W 72/042* (2013.01); *H04W 72/046* (2013.01); *H04W 80/02* (2013.01)

(58) Field of Classification Search
  CPC . H04W 72/046; H04W 80/02; H04W 7/0619; H04W 8/005; H04W 24/02; H04W 72/0426; H04W 16/28
  See application file for complete search history.

(56)             References Cited

U.S. PATENT DOCUMENTS

| | | | |
|---|---|---|---|
| 2019/0230706 A1* | 7/2019 | Li | H04W 72/1205 |
| 2019/0357252 A1* | 11/2019 | Sun | H04W 72/042 |
| 2020/0186229 A1 | 6/2020 | Raghavan et al. | |
| 2020/0314934 A1* | 10/2020 | Raghavan | H04W 76/15 |
| 2020/0358505 A1* | 11/2020 | Park | H04B 7/0639 |
| 2022/0006688 A1* | 1/2022 | Ryu | H04B 7/088 |

OTHER PUBLICATIONS

International Search Report and Written Opinion—PCT/US2021/063056—ISA/EPO—dated Apr. 5, 2022.

\* cited by examiner

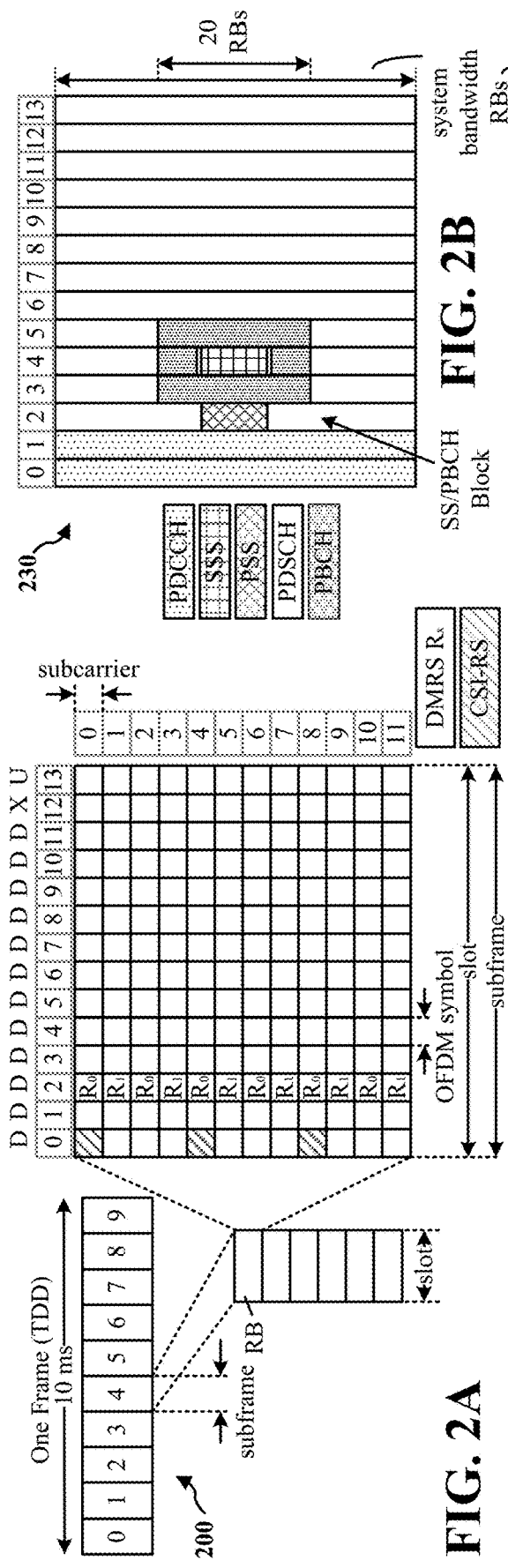
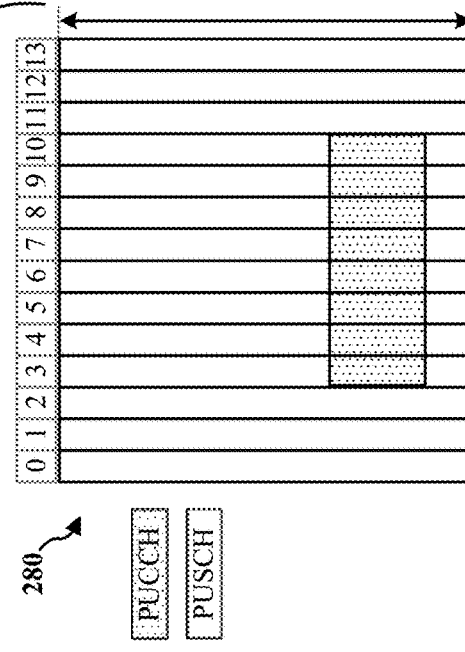
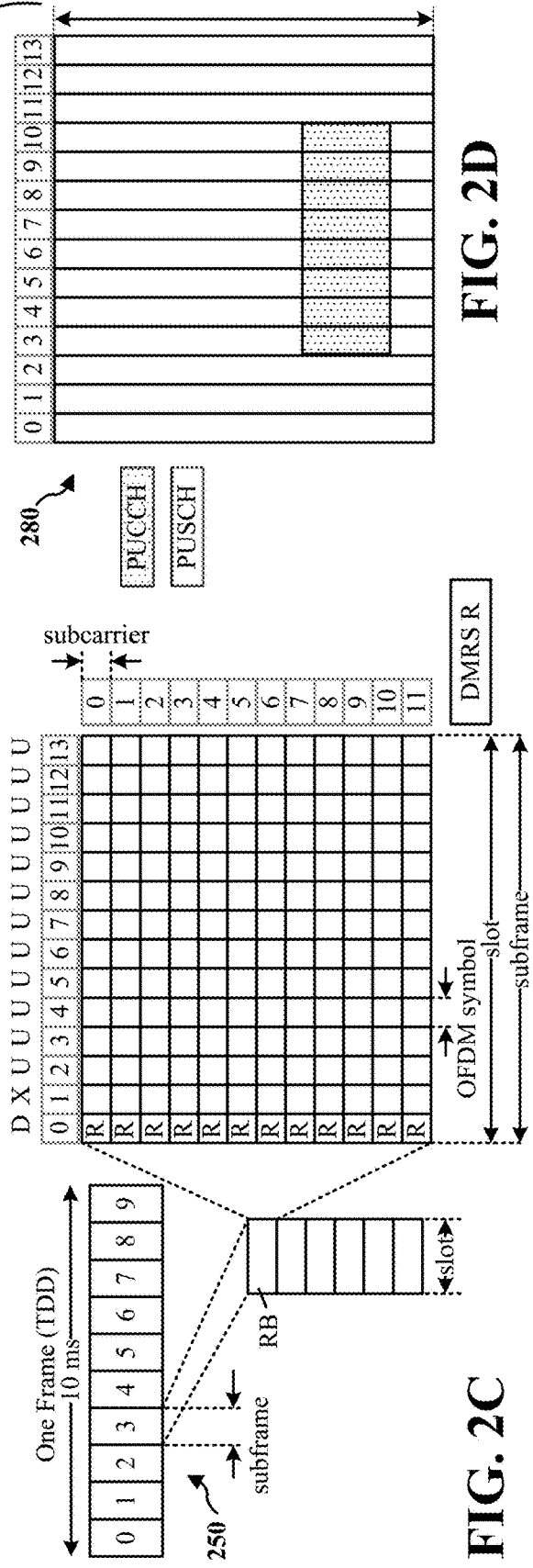
FIG. 2A  FIG. 2B  FIG. 2C  FIG. 2D

SYSTEM AND METHOD FOR IMPROVING BEAM MANAGEMENT PROCEDURES

INTRODUCTION

The present disclosure relates generally to communication systems, and more particularly, to supporting beamforming.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example telecommunication is 5G new radio (NR). 5G NR is part of a continuous mobile broadband evolution promulgated by Third Generation Partnership Project (3GPP) to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation. As the demand for mobile broadband access continues to increase, there exists a need for further improvements in 5G NR technology. Preferably, these improvements should be applicable to other multi-access technologies and the telecommunication standards that employ these technologies.

SUMMARY

The following presents a summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present one or more aspects as a prelude to the more detailed description that is presented later.

Aspects of the disclosure provide for a method, an apparatus, and a computer-readable medium for beam management. In one example, a method of beam management at a user equipment (UE) is disclosed. The method includes establishing a communication link with a base station, receiving a set of transmit beams transmitted from the base station via a plurality of symbols in a sequential manner, wherein a respective transmit beam in the set of transmit beams is received in a respective symbol of the plurality of symbols, and sending a feedback message to the base station, the feedback message comprising at least: an identification of a transmit beam having a highest measured signal strength among all sets of signal strengths measured for the set of transmit beams or an identification of a symbol in which the transmit beam having the highest measured signal strength is received, and the highest measured signal strength.

In another example, a user equipment (UE) is disclosed. The UE includes at least one processor and a memory coupled to the at least one processor. The at least one processor and the memory are configured to establish a communication link with a base station, receive a set of transmit beams transmitted from the base station via a plurality of symbols in a sequential manner, wherein a respective transmit beam in the set of transmit beams is received in a respective symbol of the plurality of symbols, and send a feedback message to the base station, the feedback message comprising at least: an identification of a transmit beam having a highest measured signal strength among all sets of signal strengths measured for the set of transmit beams or an identification of a symbol in which the transmit beam having the highest measured signal strength is received, and the highest measured signal strength.

In a further example, a user equipment (UE) is disclosed. The UE includes means for establishing a communication link with a base station, means for receiving a set of transmit beams transmitted from the base station via a plurality of symbols in a sequential manner, wherein a respective transmit beam in the set of transmit beams is received in a respective symbol of the plurality of symbols, and means for sending a feedback message to the base station, the feedback message comprising at least: an identification of a transmit beam having a highest measured signal strength among all sets of signal strengths measured for the set of transmit beams or an identification of a symbol in which the transmit beam having the highest measured signal strength is received, and the highest measured signal strength.

In another example, a non-transitory computer-readable medium storing code at a user equipment (UE) is disclosed. The code includes instructions executable by a processor to establish a communication link with a base station, receive a set of transmit beams transmitted from the base station via a plurality of symbols in a sequential manner, wherein a respective transmit beam in the set of transmit beams is received in a respective symbol of the plurality of symbols, and send a feedback message to the base station, the feedback message comprising at least: an identification of a transmit beam having a highest measured signal strength among all sets of signal strengths measured for the set of transmit beams or an identification of a symbol in which the transmit beam having the highest measured signal strength is received, and the highest measured signal strength.

In one example, a method of beam management at a base station is disclosed. The method includes establishing a communication link with a user equipment (UE), transmitting a set of transmit beams to the UE via a plurality of symbols in a sequential manner, wherein a respective transmit beam in the set of transmit beams is transmitted in a respective symbol of the plurality of symbols, and receiving a feedback message from the UE, the feedback message comprising at least: an identification of a transmit beam having a highest measured signal strength or an identification of a symbol in which the transmit beam having the highest measured signal strength is transmitted, and the highest measured signal strength.

In another example, a base station is disclosed. The base station includes at least one processor and a memory coupled to the at least one processor. The at least one processor and the memory are configured to establish a communication link with a user equipment (UE), transmit a set of transmit beams to the UE via a plurality of symbols in a sequential manner, wherein a respective transmit beam in the set of transmit beams is transmitted in a respective symbol of the plurality of symbols, and receive a feedback message from the UE, the feedback message comprising at least: an identification of a transmit beam having a highest measured signal strength or an identification of a symbol in which the transmit beam having the highest measured signal strength is transmitted, and the highest measured signal strength.

In a further example, a base station is disclosed. The base station includes means for establishing a communication link with a user equipment (UE), means for transmitting a set of transmit beams to the UE via a plurality of symbols in a sequential manner, wherein a respective transmit beam in the set of transmit beams is transmitted in a respective symbol of the plurality of symbols, and means for receiving a feedback message from the UE, the feedback message comprising at least: an identification of a transmit beam having a highest measured signal strength or an identification of a symbol in which the transmit beam having the highest measured signal strength is transmitted, and the highest measured signal strength.

In another example, a non-transitory computer-readable medium storing code at a base station is disclosed. The code includes instructions executable by a processor to establish a communication link with a user equipment (UE), transmit a set of transmit beams to the UE via a plurality of symbols in a sequential manner, wherein a respective transmit beam in the set of transmit beams is transmitted in a respective symbol of the plurality of symbols, and receive a feedback message from the UE, the feedback message comprising at least: an identification of a transmit beam having a highest measured signal strength or an identification of a symbol in which the transmit beam having the highest measured signal strength is transmitted, and the highest measured signal strength.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first radio frame, DL channels within a subframe, a second radio frame, and UL channels within a subframe, respectively.

DETAILED DESCRIPTION

Figure 1:
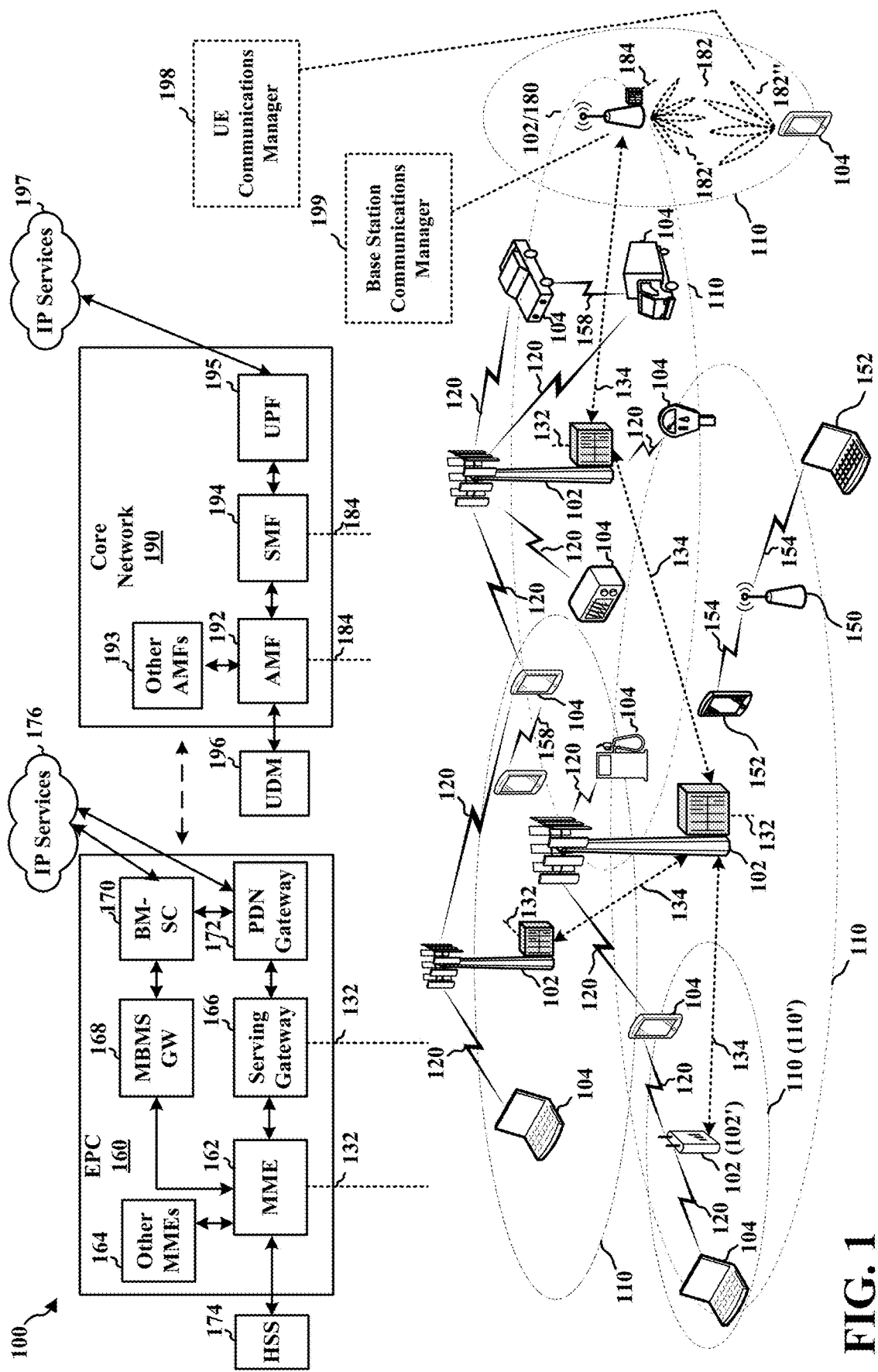
FIG. 1 is a diagram illustrating an example of a wireless communications system and an access network.

The detailed description set forth below in connection with the appended drawings is intended as a description of various configurations and is not intended to represent the only configurations in which the aspects described herein may be practiced. The detailed description includes specific details for the purpose of providing a thorough understanding of various aspects. However, it will be apparent to those skilled in the art that these aspects may be practiced without these specific details. In some instances, well known structures and components are shown in block diagram form in order to avoid obscuring such aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Aspects of the disclosure relate to beam management techniques in a wireless communication system. For example, after a UE and a base station establish a communication link, the UE and base station may perform a beam refinement/management procedure. Accordingly, the UE may receive a set of transmit beams transmitted from the base station via a group of symbols in a sequential manner One transmit beam is transmitted in each symbol of the group of symbols. For each transmit beam in each symbol, the UE may measure a set of signal strengths (e.g., reference signal receive powers (RSRPs)) using a group of receive beams. The UE may then send a feedback message to the base station including at least an identification of a transmit beam having a highest measured signal strength among all sets of signal strengths measured for the set of transmit beams or an identification of a symbol in which the transmit beam is received, and the highest measured signal strength.

In an aspect, the UE may establish a communication link with a base station and receive a set of transmit beams transmitted from the base station via a group of symbols in a sequential manner One transmit beam is received in each symbol. In response, the UE may send a feedback message to the base station. The feedback message may include at least an identification of a transmit beam having a highest measured signal strength or an identification of a symbol in which the transmit beam is received, and the highest measured signal strength. The UE may then identify a receive beam (e.g., the receive beam used to receive the transmit beam having the highest measured signal strength) and receive a data transmission from the base station using the identified receive beam.

In another aspect, the base station may establish a communication link with a user equipment (UE) and transmit a set of transmit beams to the UE via a group of symbols in a sequential manner One transmit beam is transmitted in each symbol. In response, the base station may receive a feedback message from the UE. The feedback message may include at least an identification of a transmit beam having a highest measured signal strength or an identification of a symbol in which the transmit beam is transmitted, and the highest measured signal strength. The base station may then select a transmit beam (e.g., the transmit beam having the highest measured signal strength) for a data transmission and transmit the data transmission to the UE using the selected transmit beam.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC) or a core network of any other wireless communication technology). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UE communications manager 198 that may be configured to establish a communication link with a base station, receive a set of transmit beams transmitted from the base station via a plurality of symbols in a sequential manner, wherein a respective transmit beam in the set of transmit beams is received in a respective symbol of the plurality of symbols, and send a feedback message to the base station. The feedback message may include at least an identification of a transmit beam having a highest measured signal strength (e.g., RSRP) among all sets of signal strengths measured for the set of transmit beams or an identification of a symbol in which the transmit beam having the highest measured signal strength is received, and the highest measured signal strength. The UE communications manager 198 may further be configured to identify a receive beam (e.g., on which detection of the transmit beam having the highest measured signal strength is based) and receive a data transmission from the base station using the identified receive beam.

Referring again to FIG. 1, in certain aspects, the base station 102 may include a base station communications manager 199 that may be configured to establish a communication link with a user equipment (UE) and transmit a set of transmit beams to the UE via a plurality of symbols in a sequential manner, wherein a respective transmit beam in the set of transmit beams is transmitted in a respective symbol of the plurality of symbols. The base station communications manager 199 may further be configured to receive a feedback message from the UE. The feedback message may include at least an identification of a transmit beam having a highest measured signal strength (e.g. RSRP) or an identification of a symbol in which the transmit beam having the highest measured signal strength is transmitted, and the highest measured signal strength. The base station communications manager 199 may further be configured to select a transmit beam (e.g., having the highest measured signal strength) for a data transmission and transmit the data transmission to the UE using the selected transmit beam.

FIG. 2A is a diagram 200 illustrating an example of a first subframe within a radio frame structure (e.g., 5G/NR frame structure). FIG. 2B is a diagram 230 illustrating an example of DL channels within a subframe (e.g., 5G/NR subframe). FIG. 2C is a diagram 250 illustrating an example of a second subframe within a radio frame structure (e.g., 5G/NR frame structure). FIG. 2D is a diagram 280 illustrating an example of UL channels within a subframe (e.g., 5G/NR subframe). The radio frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the radio frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a radio frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
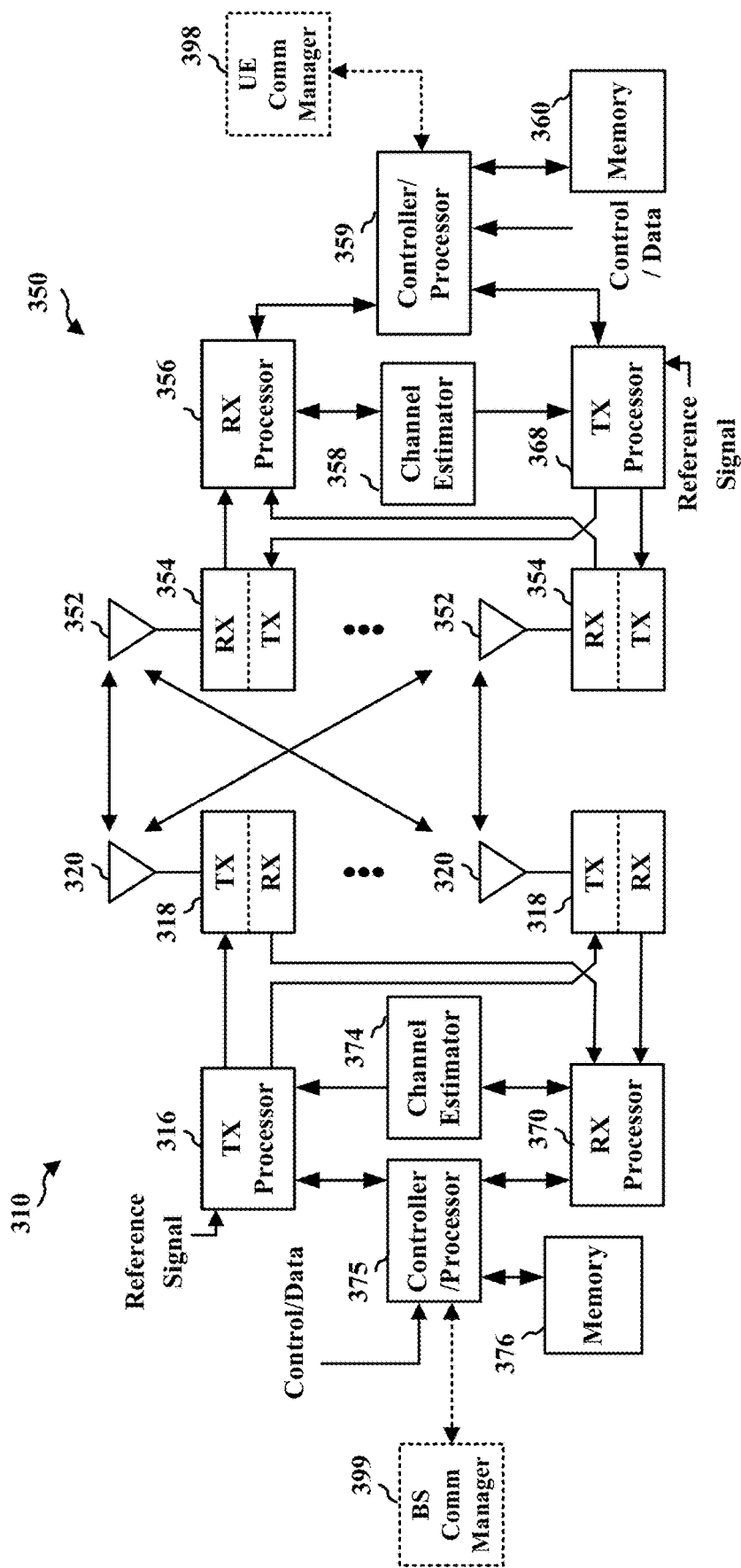
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE communications manager 198 of FIG. 1. For example, the UE 350 may include a UE communications manager 398 configured to perform the operations described above with respect to the UE communications manager 198 of FIG. 1.

At least one of the TX processor 316, the RX processor 370, and the controller/processor 375 may be configured to perform aspects in connection with the BS communications manager 199 of FIG. 1. For example, the BS 310 may include a BS communications manager 399 configured to perform the operations described above with respect to the BS communications manager 199 of FIG. 1.

A beamforming technology (e.g., 5G NR mmW technology) may use beam management procedures, such as beam measurements and beam switches, to maintain a quality of a link between a base station (e.g., gNB) and a UE at a sufficient level. Beam management procedures aim to support mobility and the selection of the best beam pairing (or beam pair link (BPL)) between the base station and the UE. Beam selection may be based on a number of considerations including logical state, power saving, robustness, mobility, throughput, etc. For example, wide beams may be used for initial connection and for coverage/mobility and narrow beams may be used for high throughput scenarios with low mobility.

When using beamforming technology, the UE and the base station may be aware of each other's location/direction and use a proper beam to communicate in each other's coverage area. The UE may use multiple beams for communication. Thus, the UE may increase a quality of communication (e.g., decrease noise, increase signal strength, increase throughput, etc.) by using a beam that is directed toward the base station. Similarly, the base station may also use multiple beams for communication, and therefore, the base station may also increase the quality of communication by using a beam that is directed toward the UE.

In an aspect, when attempting to establish a communication link (connection) with each other, the UE and the base station may perform a rough beam management procedure. At the end of the rough beam management procedure, the communication link between the UE and the base station may be established, but with each entity using a wide beam for communication. Use of a wide beam facilitates wide angular communication coverage but with low power density. Thus, the UE and the base station may strive to refine their beams to increase power density (e.g., by using a narrower beam for communication). For example, the UE and the base station may perform beam refinement procedures, e.g., P1, P2, and P3 procedures, to determine narrower beams to be used for the communication. In general the P1 procedure is related to initial attachment between the UE and the base station, the P2 procedure is related to a base station transmit beam refinement procedure, and the P3 procedure is related to a UE receive beam refinement procedure.

In an aspect, when a narrower beam is used, such as when the base station uses a narrower beam to communicate with the UE but uses a same amount of power (as used for a wider beam), a power spectral density of the narrower beam will be higher resulting in an improved communication link between the base station and the UE. For example, the UE will experience an improved signal-to-noise ratio (SNR). Hence, antenna gain increases while the same amount of power of is used.

In an aspect, the base station may initially have a rough estimate of where the UE is located based on the UE's use of a wide receive beam. For example, the wide receive beam may have a coverage area of 20 to 30 degrees. If the base station desires to use a narrower transmit beam for communication with the UE, the base station may perform a beam sweep. During the beam sweep, the base station may transmit beams one narrower transmit beam at a time in a consecutive manner and at different angles with respect to each other. All of the transmit beams of the beam sweep are spatially closed such that the base station transmits the transmit beams approximately in the direction of the UE. In an aspect, during a P2 procedure, the base station may perform the beam sweep while the UE measures a power (and other quality parameters) of each transmit beam that the UE receives from the base station. By the end of the beam sweep, the UE will have compiled a list of reception powers of all the transmit beams of the beam sweep. The UE may then report this information (or at least a transmit beam having a highest measured power) to the base station. Based on the report from the UE, the base station may choose to switch to the narrower transmit beam having the best result (e.g., switch to the transmit beam having the highest measured power) in order to communicate with the UE.

Notably, after the P2 procedure is completed and the base station has determined the narrower transmit beam to use for communication, the UE currently using the wide receive beam may also desire to switch to a narrower receive beam for communication with the base station. In an aspect, during a P3 procedure, the base station may schedule with the UE to transmit a training or pilot signal sequence for a period of time. During the period of time, the UE may perform a beam sweep in a reception manner That is, while the base station transmits pilot signals to the UE for the period of time, the UE may test (perform measurements on) its narrower receive beams, one beam at a time, in order to choose a best receive beam for receiving signals from the base station. By the end of the P3 procedure, both the base station and the UE will have determined the narrowest beams available for communicating with each other (e.g., beams yielding a maximum SNR).

Figure 4A:
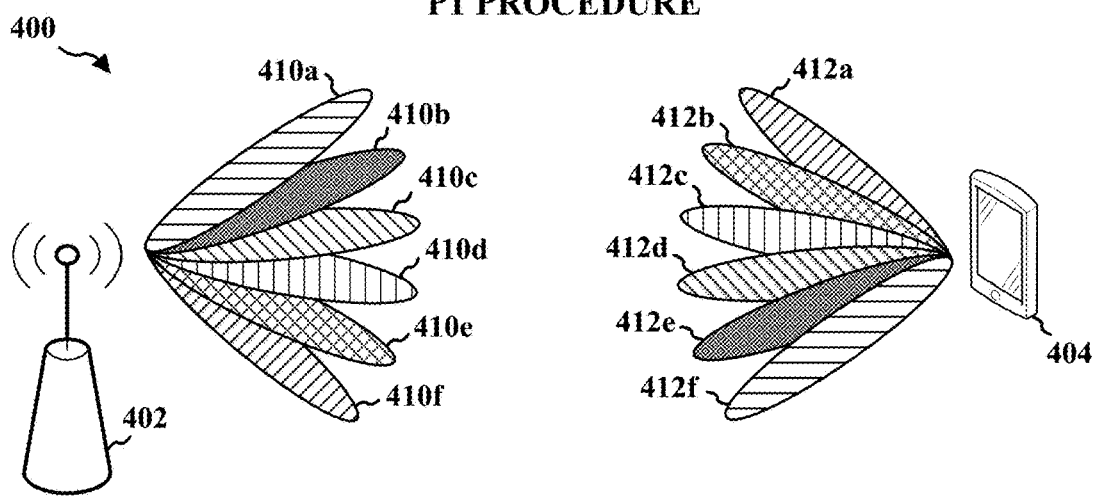
FIGS. 4A, 4B, and 4C illustrate an example of beam pair link (BPL) discovery and refinement in accordance with aspects of the present disclosure.
Figure 4B:
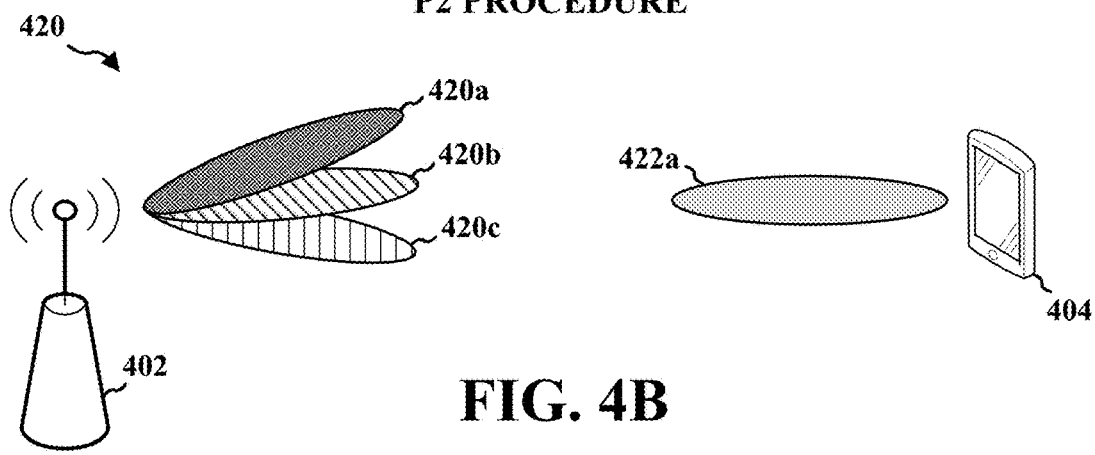
Figure 4C:
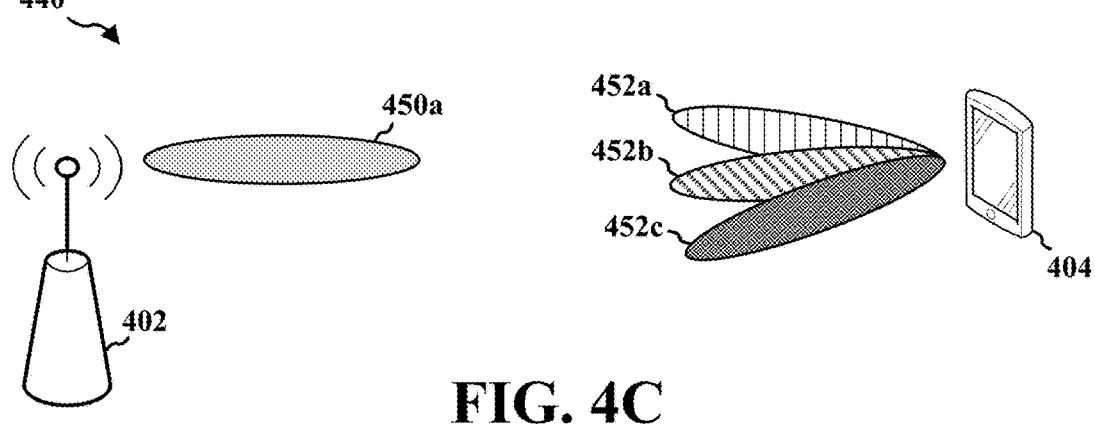

FIGS. 4A, 4B, and 4C illustrate an example of beam pair link (BPL) discovery and refinement. In 5G-NR, P1, P2, and P3 procedures are used for BPL discovery and refinement. The network uses a P1 procedure to enable the discovery of new BPLs. Referring to FIG. 4A, in a P1 procedure 400, a BS 402 transmits different symbols of a reference signal (e.g., P1 signal), each beamformed in a different spatial direction such that several (most, all) relevant places of the cell are reached. Stated otherwise, the BS 402 transmits beams using different transmit beams (e.g., transmit beams 410*a* to 410*f*) over time in different directions. For successful reception of at least a symbol of the P1 signal, a UE 404 searches for an appropriate receive beam. The UE 404 searches using available receive beams (e.g., receive beams 412*a* to 412*f*) and applying a different UE receive beam during each occurrence of the periodic P1 signal.

Once the UE 404 has succeeded in receiving a symbol of the P1 signal, the UE 404 has discovered a BPL. In some aspects, the UE 404 may not want to wait until it has found the best UE receive beam, since this may delay further actions. The UE 404 may measure a signal strength (e.g., reference signal receive power (RSRP)) and report the symbol index together with the RSRP to the BS 402. Such a report may contain the findings of one or more BPLs. In an example, the UE 404 may determine a received signal having a high RSRP. The UE 404 may not know which transmit beam the BS 402 used to transmit; however, the UE 404 may report to the BS 402 the time at which it observed the signal having a high RSRP. The BS 402 may receive this report and may determine which transmit beam the BS 402 used at the given time.

The BS 402 may then offer P2 and P3 procedures to refine an individual BPL. Referring to FIG. 4B, the P2 procedure 420 refines the BS beam (transmit beam) of a BPL. The BS 402 may transmit a set of symbols of a reference signal with different BS beams that are spatially close to the BS beam of the BPL (i.e., the BS 402 performs a sweep using neighboring beams around the selected beam). For example, the BS 402 may transmit a plurality of transmit beams (e.g., transmit beams 420*a*, 420*b*, and 420*c*) over a consecutive sequence of symbols, with a different beam per symbol. In the P2 procedure 420, the UE 404 keeps its receive beam (e.g., receive beam 422*a*) constant. Thus, the UE 404 uses the same beam as in the BPL. The BS beams used for the P2 procedure 420 may be different from those used for the P1 procedure in that they may be spaced closer together or they may be more focused. The UE 404 may measure the signal strength (e.g., RSRP) for the various BS beams (e.g., beams 420*a*, 420*b*, and 420*c*) and indicate the strongest BS beam and/or the highest RSRP to the BS 402. Additionally or alternatively, the UE 404 may indicate all RSRPs measured for the BS beams. The UE 404 may indicate such information via a CSI-RS resource indicator (CRI)-L1-RSRP feedback message, which may contain the BS beams' RSRPs in a sorted manner. The BS 402 may switch an active beam to the strongest BS beam reported, thus keeping the BPL's RSRP at a highest level and supporting low mobility. If the transmit beams used for the P2 procedure are spatially close (or even partially overlapped), no beam switch notification may be sent to the UE 404.

Referring to FIG. 4C, the P3 procedure 440 refines the UE beam (receive beam) of a BPL. Here, the BS 402 transmits the same transmit beam 450*a* over a consecutive sequence of symbols. The UE 404 may use this opportunity to refine the UE receive beam by checking a strength of multiple receive beams (from the same or different UE panels). That is, while the BS beam stays constant, the UE 404 may scan using different receive beams (i.e., the UE 404 performs a sweep using neighboring beams (e.g., receive beams 452*a*, 452*b*, and 452*c*)). The UE 404 may measure the RSRP of each UE beam (receive beam) and identify the best UE beam. Afterwards, the UE 404 may use the best UE beam for the BPL. The UE 404 may or may not send a report of receive beam RSRP(s) to the BS 402. By the end of the P2 and P3 procedures, the refined BS transmit beam and the refined UE receive beam maximize the BPL's RSRP.

In certain aspects, execution of the P2 and P3 procedures of the beam refinement procedure may have drawbacks. For example, because a duration of the beam refinement procedure includes a duration of the P2 procedure as well as a duration of the P3 procedure, the beam refinement procedure may be undesirably long. In another example, symbols designated for beam refinement (of both the P2 and P3 procedures) may not contain PDSCH data. Thus, system overhead is increased since a large amount of system resources are used to perform the P2 and P3 procedures without communicating any user data. In a further example, the P2 and P3 procedures may be sub-optimal as not all UE beams (receive beams) are used to measure each of the BS beams (transmit beams). Thus, there is no guarantee of finding the receive beam-transmit beam pair link (or BPL) with the strongest/highest RSRP.

Figure 5:
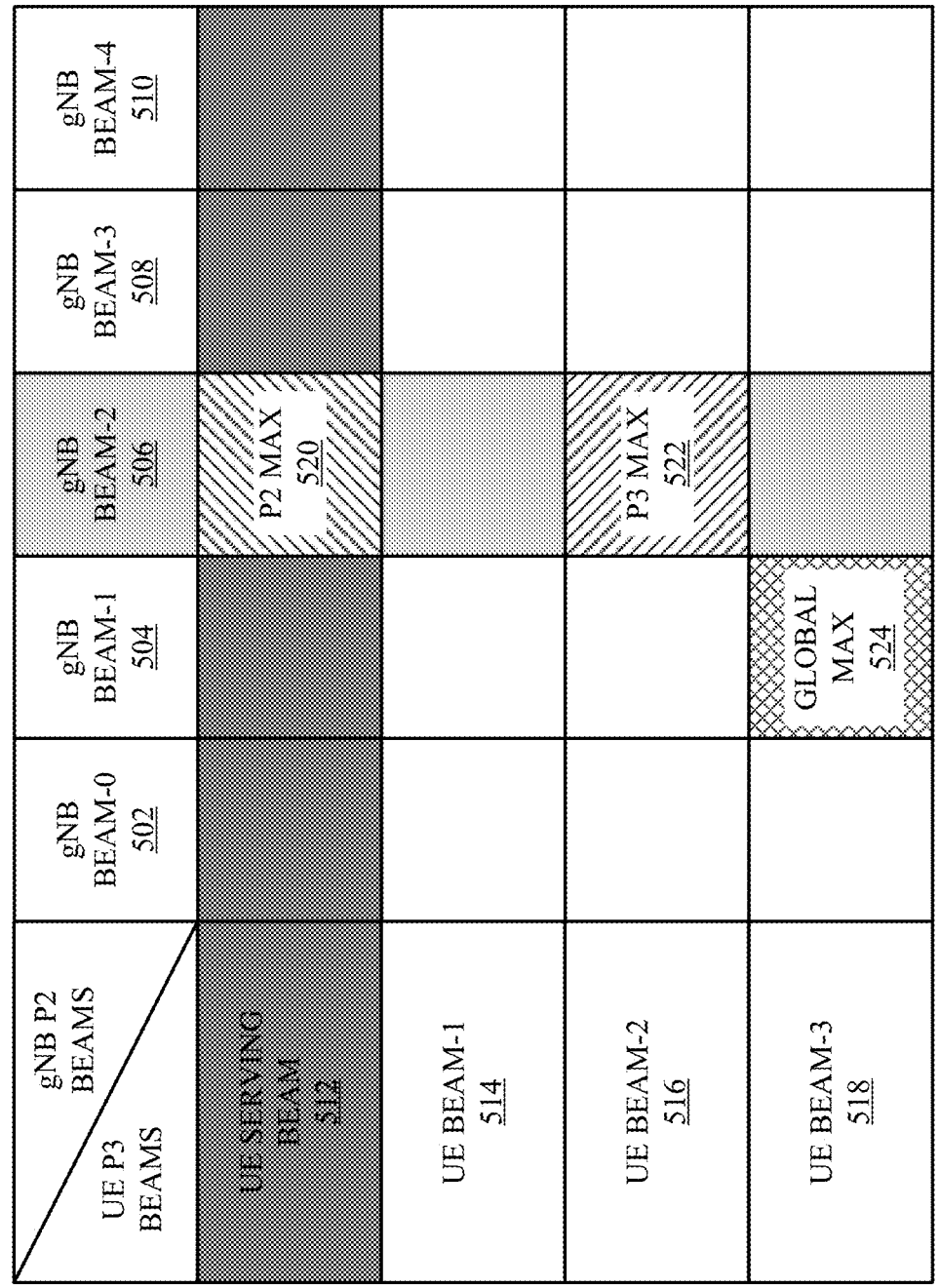
FIG. 5 is an example table illustrating a beam refinement procedure using example P2 and P3 procedures in accordance with aspects of the present disclosure.

FIG. 5 is an example table 500 illustrating a beam refinement procedure using example P2 and P3 procedures. The table 500 depicts execution of the P2 and P3 procedures. For the sake of simplicity, it is assumed that all BS (gNB) beams or transmit beams have a same quasi-collocation (QCL).

During the P2 procedure, the gNB sweeps transmit beams (e.g., gNB beam-0 502, gNB beam-1 504, gNB beam-2 506, gNB beam-3 508, and gNB beam-4 510) while the UE maintains the same receive beam (e.g., UE serving beam 512). As a result of the P2 procedure, a gNB transmit beam (gNB beam-2 506) having a maximal signal strength (e.g., maximal RSRP) P2 max 520 may be found by the UE and reported to the gNB. The gNB may then perform a silent beam switch to the gNB beam-2 506.

During the P3 procedure, the UE sweeps receive beams (e.g., UE serving beam 512, UE beam-1 514, UE beam-2 516, and UE beam-3 518) in front of the same transmit beam (e.g., gNB beam-2 506). As a result of the P3 procedure, a UE receive beam (e.g., UE beam-2 516) having a maximal signal strength (e.g., maximal RSRP) P3 max 522 may be determined by the UE. The UE may then perform a beam switch to the UE beam-2 516.

Notably, at the end of the P2 procedure, a transmit beam having a local maximal RSRP (e.g., P2 max 520) is found by sweeping the transmit beams and maintaining a constant receive beam. That is, the base station determines a best transmit beam (Tx beam) for communication based on the transmit beam measured to have the highest RSRP (e.g., gNB beam-2 506 having P2 max 520) at the UE using a single receive beam (e.g., UE serving beam 512). At the end of the P3 procedure, a receive beam having a local maximal RSRP (e.g., P3 max 522) is found by sweeping the receive beams and maintaining a constant transmit beam. That is, the UE determines a best receive beam (Rx beam) for communication based on the receive beam that yields the highest RSRP (e.g., UE beam-2 516 having P3 max 522) for a single transmit beam (e.g., gNB beam-2 506).

In an aspect, the P2 and P3 procedures may not be able to find a transmit beam-receive beam pair link having a global maximal signal strength (e.g., a best overall Tx-Rx beam pair link). According to the P2 procedure, the transmit beam having the local maximal RSRP (P2 max 520) is determined based on only one receive beam (UE serving beam 512). Moreover, according to the P3 procedure, the receive beam having the local maximal RSRP (P3 max 522) is determined based on only one transmit beam (gNB beam-2 506). However, if the signal strength of each transmit beam (e.g., gNB beam-0 502, gNB beam-1 504, gNB beam-2 506, gNB beam-3 508, and gNB beam-4 510) were measured using each receive beam (e.g., UE serving beam 512, UE beam-1 514, UE beam-2 516, and UE beam-3 518) individually, then a best Tx-Rx beam pair link yielding a highest signal strength (RSRP) may be determined to be, for example, the beam pair link including gNB beam-1 504 and UE beam-3 518 having the global maximal signal strength (global max) 524.

Notably, the beam pair link including gNB beam-1 504 and UE beam-3 518 is not found during the performance of the P2 and P3 procedures, as described above, since not all combinations of transmit beams and receive beams are measured during such procedures. Thus, performance of the P2 and P3 procedures may be imprecise in finding a Tx-RX beam pair link yielding a highest signal strength for communication between the base station and the UE. Accordingly, aspects of the present disclosure relate to a beam refinement procedure that measures a signal strength of all combinations of transmit beams and receive beams in a speedy manner to accurately determine a Tx-Rx beam pair link yielding a highest signal strength.

In an aspect, sub-THz frequency range (e.g., 140 GHz) radio technology may provide for a large number of elements in a small area by exploiting a short wavelength. This along with efficient implementation may enable simultaneous beams operation. Hence, a UE operating in the sub-THz frequency range may measure signal strengths (RSRPs) of multiple UE receive beams simultaneously for every gNB transmit beam during the P2 procedure. Thus, the UE may measure a signal strength of a gNB transmit beam using multiple UE receive beams during one symbol (in one occasion).

Aspects of the present disclosure relate to providing a UE capability that allows the UE to forgo the P3 procedure during beam refinement. The UE may leverage the UE capability to measure multiple receive beams simultaneously during the P2 procedure, thus making the P3 procedure redundant. In one example, at the end of the P2 procedure, the UE may refine its receive beam to the one used for achieving a best reported transmit beam. In another example, after the end of the P2 procedure, an explicit P2 report-based beam switch procedure may be defined in which the gNB notifies the UE, e.g., using a MAC-control element (MAC-CE) or DCI field on a CSI-RS resource indicator (CRI), of a beam switch. The CRI may be based on a last-received P2 report.

Advantages of the present disclosure include a reduction of stages in the beam refinement procedure (e.g., P3 procedure is no longer performed). This results in a shorter beam refinement duration, hence, power savings, and lower overhead. Beam refinement results are also optimized. For example, due to the new capability of the UE, multiple UE beams can now be measured simultaneously during the P2 procedure. This allows for the best available Tx-Rx beam coupling to be found among the multiple UE beams. In another example, for the UE capable of measuring multiple UE beams, a larger number of UE beams can be used for beam refinement.

Figure 6:
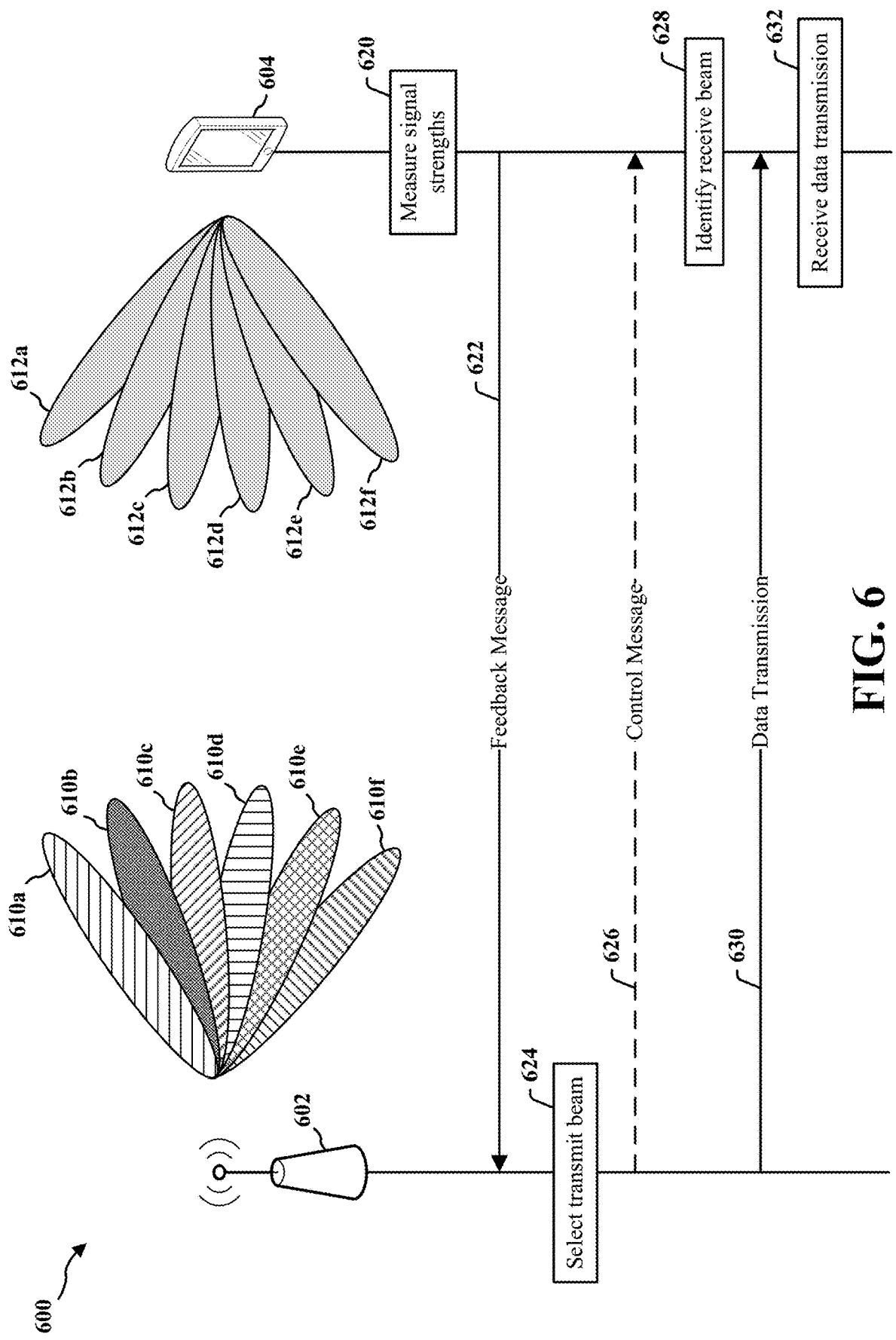
FIG. 6 illustrates an example beam refinement procedure in accordance with aspects of the present disclosure.

FIG. 6 illustrates an example beam refinement procedure 600 according to aspects of the present disclosure. A base station 602 may establish a connection with a UE 604 via an initial attachment process (e.g., P1 procedure). Upon establishing the connection, the base station 602 and the UE 604 may perform the beam refinement procedure 600 to determine a transmit beam-receive beam pair link (BPL) with a strongest/highest signal strength (RSRP). In an aspect, during or after the initial attachment process, the UE 604 may send a message to the base station 602 indicating the UE's capability of performing the beam refinement procedure 600.

In the procedure 600, the base station 602 transmits a set of transmit beams (e.g., transmit beams 610a to 610f) to a UE 604 via a set of symbols in a sequential manner. The transmit beams are transmitted at different angles with respect to each other. Moreover, each one of the transmit beams 610a to 610f is transmitted in a respective symbol of the set of symbols. For example, the base station 602 sequentially transmits a first transmit beam 610a in a first symbol, a second transmit beam 610b in a second symbol, a third transmit beam 610c in a third symbol, and so forth, until a sixth transmit beam 610f is transmitted in a sixth symbol.

Meanwhile, the UE 604 receives the set of transmit beams transmitted from the base station 602 via the set of symbols in the sequential manner. In particular, the UE 604 receives a respective transmit beam (e.g., one of the transmit beams 610a to 610f) in a respective symbol of the set of symbols using multiple receive beams in a simultaneous (or near-simultaneous) manner. For example, the UE 604 simultaneously uses multiple receive beams 612a to 612f to receive the first transmit beam 610a in the first symbol, simultaneously uses the multiple receive beams 612a to 612f to receive the second transmit beam 610b in the second symbol, simultaneously uses the multiple receive beams 612a to 612f to receive the third transmit beam 610c in the third symbol, and so forth, until the sixth transmit beam 610f is received simultaneously by the multiple receive beams 612a to 612f in the sixth symbol. As shown in FIG. 6 and described herein, six receive beams 612a to 612f are used for simultaneously receiving a transmit beam within a symbol, however, it is contemplated that a larger number of receive beams may be used for simultaneous transmit beam reception (e.g., 30 receive beams, 100 receive beams, etc.)

In an aspect, at 620, the UE 604 measures a set of signal strengths (e.g., RSRPs) for each respective transmit beam received in the respective symbol using the multiple receive beams. A respective signal strength in the set of signal strengths is measured based on a respective receive beam of the multiple receive beams. For example, in the first symbol, the UE 604 measures a first set of signal strengths for the first transmit beam 610a by measuring a first signal strength of the first transmit beam 610a based on a first receive beam 612a, measuring a second signal strength of the first transmit beam 610a based on a second receive beam 612b, measuring a third signal strength of the first transmit beam 610a based on a third receive beam 612c, and so forth, until a sixth signal strength of the first transmit beam 610a is measured based on a sixth receive beam 612f. In the second symbol, the UE 604 measures a second set of signal strengths for the second transmit beam 610b by measuring a first signal strength of the second transmit beam 610b based on the first receive beam 612a, measuring a second signal strength of the second transmit beam 610b based on the second receive beam 612b, measuring a third signal strength of the second transmit beam 610b based on the third receive beam 612c, and so forth, until a sixth signal strength of the second transmit beam 610b is measured based on the sixth receive beam 612f. The UE 604 repeats this process for each remaining transmit beam (e.g., transmit beams 610c to 610f) received in a respective symbol. Thus, the UE 604 measures a third set of signal strengths for the third transmit beam 610c received in the third symbol, a fourth set of signal strengths for the fourth transmit beam 610d received in the fourth symbol, a fifth set of signal strengths for the fifth transmit beam 610e received in the fifth symbol, and a sixth set of signal strengths for the sixth transmit beam 610f received in the sixth symbol, based on the multiple receive beams 612a to 612f as described above with respect to the first transmit beam 610a and the second transmit beam 610b.

After measuring a set of signal strengths for each transmit beam in the set of transmit beams 610a to 610f, the UE 604 may detect/determine the transmit beam having a highest measured signal strength among all sets of signal strengths measured for the set of transmit beams. The UE 604 may further identify the symbol in which the transmit beam having the highest measured signal strength is received. As an example, the transmit beam having the highest measured signal strength may be the fourth transmit beam 610d, which is received in the fourth symbol.

At 622, the UE 604 sends a feedback message to the base station 602. The feedback message may include at least an identification of a transmit beam having the highest measured signal strength among all sets of signal strengths measured for the set of transmit beams (e.g., identification of the fourth transmit beam 610d) or an identification of a symbol in which the transmit beam having the highest measured signal strength is received (e.g., identification of the fourth symbol). The feedback message may further include a value of the highest measured signal strength. In an aspect, the feedback message may also include all sets of signal strengths measured for the set of transmit beams and an identification of a symbol in which a respective transmit beam corresponding to a respective set of signal strengths is received.

At 624, the base station 602 may select one of the transmit beams 610a to 612f for a data transmission based on the feedback message. For example, the base station 602 may select the transmit beam having the highest measured signal strength for a data transmission (e.g., fourth transmit beam 610d) according to the information included in the feedback message. Thereafter, at 626, the base station 602 may optionally transmit a control message to the UE indicating the selected transmit beam. The control message may be transmitted via downlink control information (DCI) or a medium access channel-control element (MAC-CE).

At 628, the UE 604 may identify a receive beam to be used for receiving the data transmission. For example, the UE 604 may identify the receive beam on which detection of the transmit beam having the highest measured signal strength is based. In another example, if the UE 604 receives the control message from the base station 602 indicating the selected transmit beam, the UE 604 may identify the receive beam that yields a highest measured signal strength for the selected transmit beam.

At 630, the base station 602 transmits the data transmission to the UE 604 using the selected transmit beam. At 632, the UE 604 receives the data transmission from the base station 602 using the identified receive beam.

Figure 7:
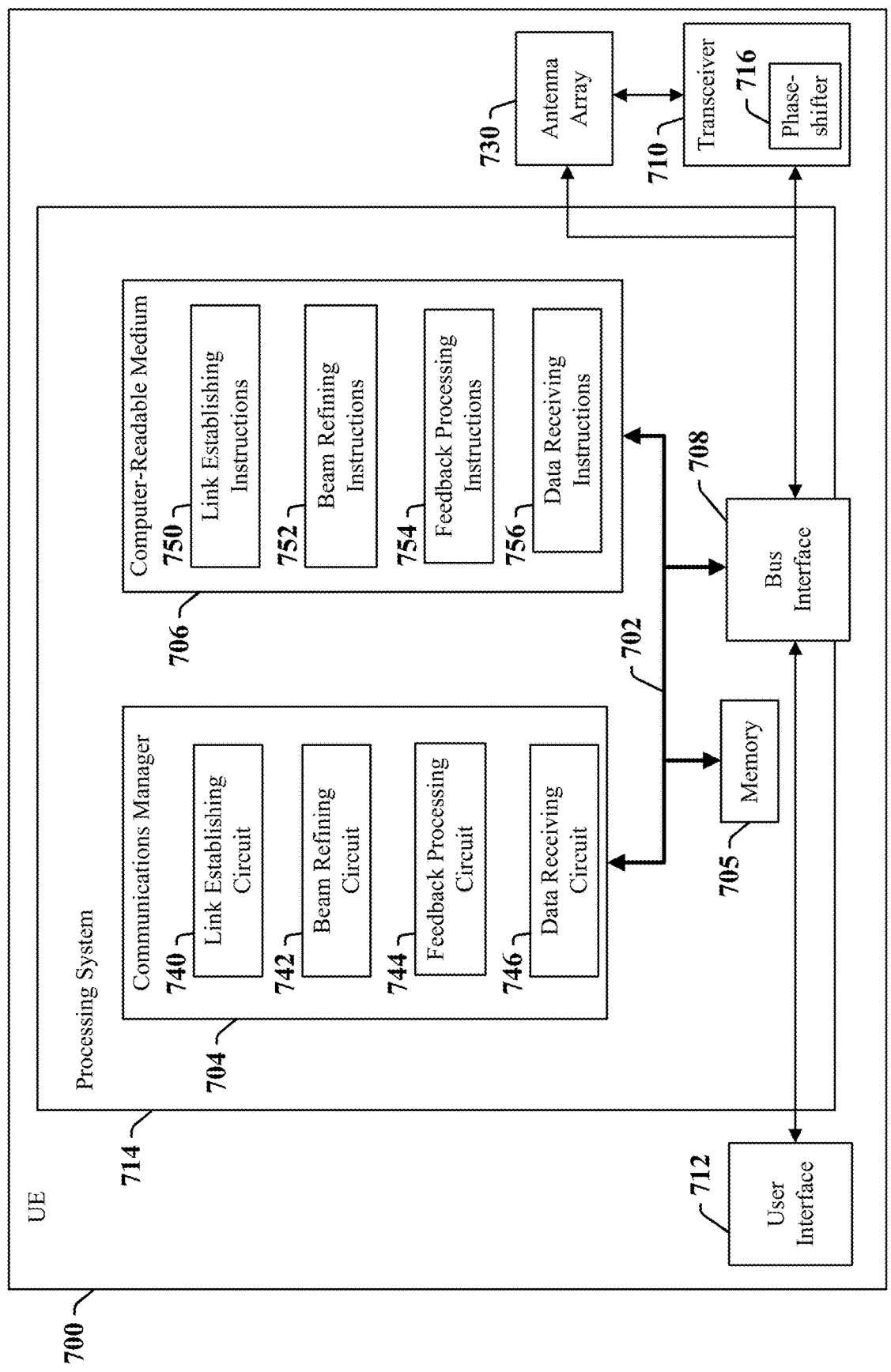
FIG. 7 is a block diagram illustrating an example of a hardware implementation for an exemplary UE employing a processing system in accordance with aspects of the present disclosure.

FIG. 7 is a block diagram illustrating an example of a hardware implementation for an exemplary UE 700 employing a processing system 714. For example, the UE 700 may be a UE, as illustrated in any one or more of FIGS. 1 and 3-6. The UE 700 may be implemented with a processing system 714 that includes one or more processors 704 (e.g., communications manager). Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 700 may be configured to perform any one or more of the functions described herein. That is, the processor 704, as utilized in a UE 700, may include the UE communications manager 198/398 and used to implement any one or more of the processes and procedures described below and illustrated in FIG. 8.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. In some examples, the transceiver 710 may include a phase-shifter 716 for digital and/or analog beamforming via one or more antenna array(s) 730. Depending upon the nature of the apparatus, a user interface 712 (e.g., keypad, display, speaker, microphone, joystick) may also be provided. Of course, such a user interface 712 is optional, and may be omitted in some examples, such as a base station.

In some aspects of the disclosure, the processor 704 (e.g., UE communications manager 198/398) may include link establishing circuitry 740 configured for various functions, including, for example, establishing a communication link with a base station. For example, the link establishing circuitry 740 may be configured to implement one or more of the functions described below in relation to FIG. 8, including, e.g., block 802. The processor 704 may also include beam refining circuitry 742 configured for various functions, including, for example, receiving a set of transmit beams transmitted from the base station via a plurality of symbols in a sequential manner, wherein a respective transmit beam in the set of transmit beams is received in a respective symbol of the plurality of symbols. For example, the beam refining circuitry 742 may be configured to implement one or more of the functions described below in relation to FIG. 8, including, e.g., block 804. The processor 704 may also include feedback processing circuitry 744 configured for various functions, including, for example, sending a feedback message to the base station. For example, the feedback processing circuitry 744 may be configured to implement one or more of the functions described below in relation to FIG. 8, including, e.g., block 806. The processor 704 may also include data receiving circuitry 746 configured for various functions, including, for example, receiving a control message from the base station, the control message indicating a transmit beam selected for a data transmission based on the feedback message, identifying a receive beam of the plurality of receive beams on which detection of the transmit beam having the highest measured signal strength is based, identifying a receive beam of the plurality of receive beams yielding a highest measured signal strength for the selected transmit beam, and receiving the data transmission from the base station using the identified receive beam. For example, the data receiving circuitry 746 may be configured to implement one or more of the functions described below in relation to FIG. 8, including, e.g., blocks 808, 810, and 812.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may include link establishing instructions 750 configured for various functions, including, for example, establishing a communication link with a base station. For example, the link establishing instructions 750 may be configured to implement one or more of the functions described below in relation to FIG. 8, including, e.g., block 802. The computer-readable storage medium 706 may also include beam refining instructions 752 configured for various functions, including, for example, receiving a set of transmit beams transmitted from the base station via a plurality of symbols in a sequential manner, wherein a respective transmit beam in the set of transmit beams is received in a respective symbol of the plurality of symbols, identifying a receive beam of a plurality of receive beams on which detection of a transmit beam having a highest measured signal strength is based, and identifying a receive beam of the plurality of receive beams yielding a highest measured signal strength for a selected transmit beam. For example, the beam refining instructions 752 may be configured to implement one or more of the functions described below in relation to FIG. 8, including, e.g., blocks 804 and 810. The computer-readable storage medium 706 may also include feedback processing instructions 754 configured for various functions, including, for example, sending a feedback message to the base station. For example, the feedback processing instructions 754 may be configured to implement one or more of the functions described below in relation to FIG. 8, including, e.g., block 806. The computer-readable storage medium 706 may also include data receiving instructions 756 configured for various functions, including, for example, receiving a control message from the base station, the control message indicating a transmit beam selected for a data transmission based on the feedback message, identifying the receive beam of the plurality of receive beams on which detection of the transmit beam having the highest measured signal strength is based, identifying the receive beam of the plurality of receive beams yielding the highest measured signal strength for the selected transmit beam, and receiving the data transmission from the base station using the identified receive beam. For example, the data receiving instructions 756 may be configured to implement one or more of the functions described below in relation to FIG. 8, including, e.g., blocks 808, 810, and 812.

Figure 8:
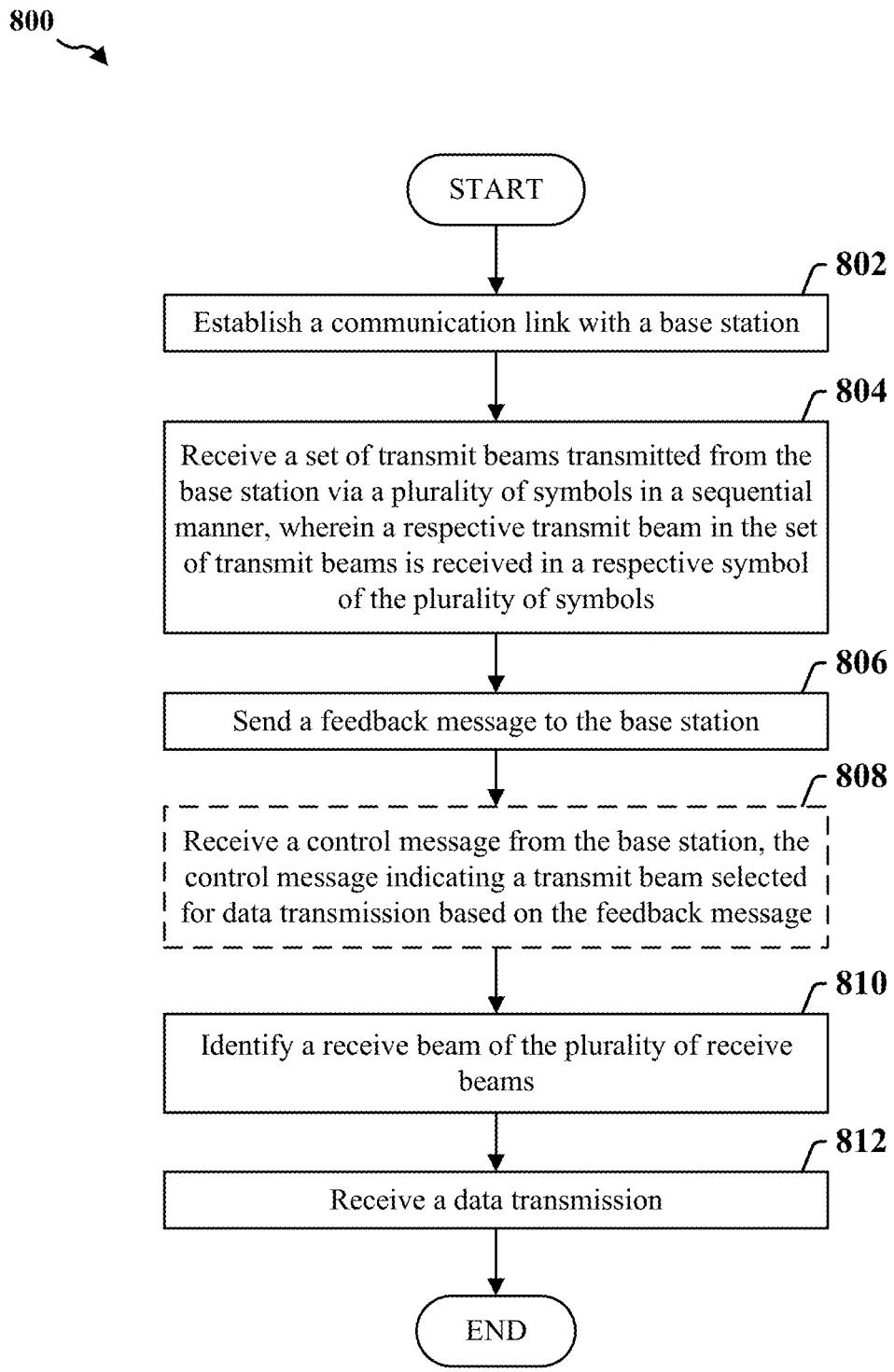
FIG. 8 is a flow chart illustrating an exemplary process for beam management at a UE in accordance with aspects of the present disclosure.

FIG. 8 is a flow chart illustrating an exemplary process 800 for beam management at a UE in accordance with aspects of the present disclosure. As described below, some or all illustrated features may be omitted in a particular implementation within the scope of the present disclosure, and some illustrated features may not be required for implementation of all aspects. In some examples, the process 800 may be carried out by the UE 700 illustrated in FIG. 7, which may be a UE, as illustrated in any one or more of FIGS. 1 and 3-6. In some examples, the process 800 may be carried out by any suitable apparatus or means for carrying out the functions or algorithm described below.

At block 802, the UE establishes a communication link with a base station. During a beam management/refinement procedure, the base station transmits a set of transmit beams to the UE via a plurality of symbols in a sequential manner. In particular, the base station transmits a respective transmit beam in the set of transmit beams in a respective symbol of the plurality of symbols.

At block 804, the UE receives the set of transmit beams transmitted from the base station via the plurality of symbols in the sequential manner That is, the UE receives a respective transmit beam in the set of transmit beams in a respective symbol of the plurality of symbols. In an aspect, the transmit beams are received from the base station at different angles with respect to each other.

In an aspect, UE reception of the set of transmit beams includes measuring, for each transmit beam in the set of transmit beams, a set of signal strengths (e.g., set of reference signal receive powers (RSRPs)) corresponding to the respective transmit beam using a plurality of receive beams in the respective symbol. In particular, a respective signal strength in the set of signal strengths is measured based on a respective receive beam of the plurality of receive beams. UE reception of the set of transmit beams further includes detecting a transmit beam having the highest measured signal strength (e.g., highest measured RSRP) among all sets of signal strengths (e.g., all sets of RSRPs) measured for the set of transmit beams and identifying a symbol in which the transmit beam having the highest measured signal strength is transmitted.

At block 806, the UE sends a feedback message to the base station. The feedback message includes at least an identification of the transmit beam having the highest measured signal strength among all sets of signal strengths measured for the set of transmit beams or an identification of the symbol in which the transmit beam having the highest measured signal strength is transmitted. The feedback message may also include at least the highest measured signal strength. In an aspect, the feedback message may further include all sets of signal strengths measured for the set of transmit beams and an identification of a symbol in which a respective transmit beam corresponding to a respective set of signal strengths is received.

At block 808, the UE may optionally receive a control message from the base station. The control message may indicate a transmit beam selected by the base station for a data transmission based on the feedback message. In an aspect, the control message may be received via downlink control information (DCI) and/or a medium access channel-control element (MAC-CE). Accordingly, at block 810, the UE identifies a receive beam of the plurality of receive beams yielding a highest measured signal strength for the selected transmit beam, and at block 812, the UE receives a data transmission from the base station using the identified receive beam.

Alternatively, if the UE does not receive the control message at block 808, the UE may, at block 810, identify a receive beam of the plurality of receive beams on which detection of the transmit beam having the highest measured signal strength is based. Thereafter, at block 812, the UE may receive a data transmission from the base station using the identified receive beam.

In one configuration, the UE 700 for wireless communication includes means for establishing (e.g., link establishing circuitry 740, transceiver 710, and/or antenna array 730) a communication link with a base station, means for receiving (e.g., beam refining circuitry 742, transceiver 710, and/or antenna array 730) a set of transmit beams transmitted from the base station via a plurality of symbols in a sequential manner, wherein a respective transmit beam in the set of transmit beams is received in a respective symbol of the plurality of symbols, means for sending (e.g., feedback processing circuitry 744, transceiver 710, and/or antenna array 730) a feedback message to the base station, means for receiving (e.g., data receiving circuitry 746, transceiver 710, and/or antenna array 730) a control message from the base station, the control message indicating a transmit beam selected for a data transmission based on the feedback message, means for identifying (e.g., beam refining circuitry 742, data receiving circuitry 746, transceiver 710, and/or antenna array 730) a receive beam of the plurality of receive beams on which detection of the transmit beam having the highest measured signal strength is based, means for identifying (e.g., beam refining circuitry 742, data receiving circuitry 746, transceiver 710, and/or antenna array 730) a receive beam of the plurality of receive beams yielding a highest measured signal strength for the selected transmit beam, and means for receiving (e.g., data receiving circuitry 746, transceiver 710, and/or antenna array 730) the data transmission from the base station using the identified receive beam. In one aspect, the aforementioned means may be the processor 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS.

1 and 3-6 and utilizing, for example, the processes and/or algorithms described herein in relation to FIG. 8.

Figure 9:
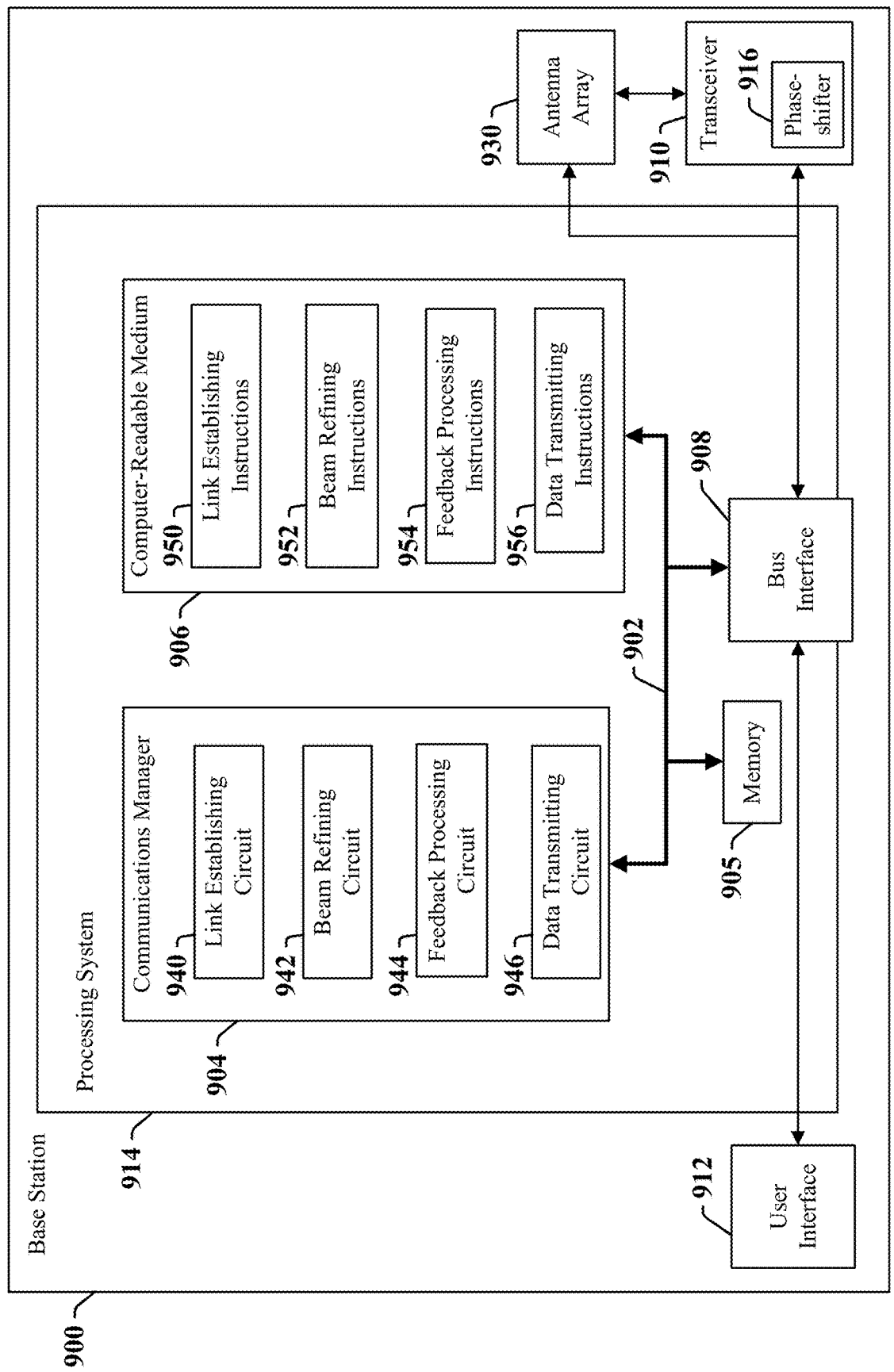
FIG. 9 is a block diagram illustrating an example of a hardware implementation for an exemplary base station employing a processing system in accordance with aspects of the present disclosure.

FIG. 9 is a block diagram illustrating an example of a hardware implementation for an exemplary base station 900 employing a processing system 914. In accordance with various aspects of the disclosure, an element, or any portion of an element, or any combination of elements may be implemented with a processing system 914 that includes one or more processors 904 (e.g., communications manager). For example, the base station 900 may be a base station or gNB as illustrated in any one or more of FIGS. 1 and 3-6.

The processing system 914 may be substantially the same as the processing system 714 illustrated in FIG. 7, including a bus interface 908, a bus 902, memory 905, a processor 904, and a computer-readable medium 906. Furthermore, the base station 900 may include a user interface 912, a transceiver 910 (including a phase-shifter 916), and one or more antenna arrays 930 substantially similar to those described above in FIG. 7. The processor 904, as utilized in a base station 900, may include the BS communications manager 199/399 and used to implement any one or more of the processes described below and illustrated in FIG. 10.

In some aspects of the disclosure, the processor 904 (e.g., BS communications manager 199/399) may include link establishing circuitry 940 configured for various functions, including, for example, establishing a communication link with a user equipment (UE). For example, the link establishing circuitry 940 may be configured to implement one or more of the functions described below in relation to FIG. 10, including, e.g., block 1002. The processor 904 may further include beam refining circuitry 942 configured for various functions, including, for example, transmitting a set of transmit beams to the UE via a plurality of symbols in a sequential manner, wherein a respective transmit beam in the set of transmit beams is transmitted in a respective symbol of the plurality of symbols, selecting a transmit beam for a data transmission based on a feedback message, and selecting a transmit beam having a highest measured signal strength for a data transmission. For example, the beam refining circuitry 942 may be configured to implement one or more of the functions described below in relation to FIG. 10, including, e.g., blocks 1004 and 1008. The processor 904 may further include feedback processing circuitry 944 configured for various functions, including, for example, receiving a feedback message from the UE. For example, the feedback processing circuitry 944 may be configured to implement one or more of the functions described below in relation to FIG. 10, including, e.g., block 1006. The processor 904 may further include data transmitting circuitry 946 configured for various functions, including, for example, selecting a transmit beam for a data transmission based on the feedback message, selecting a transmit beam having a highest measured signal strength for a data transmission, transmitting a control message to the UE indicating the selected transmit beam, and transmitting the data transmission to the UE using the selected transmit beam. For example, the data transmitting circuitry 946 may be configured to implement one or more of the functions described below in relation to FIG. 10, including, e.g., blocks 1008, 1010, and 1012.

In one or more examples, the computer-readable storage medium 906 may include link establishing instructions 950 configured for various functions, including, for example, establishing a communication link with a user equipment (UE). For example, the link establishing instructions 950 may be configured to implement one or more of the functions described below in relation to FIG. 10, including, e.g., block 1002. The computer-readable storage medium 906 may further include beam refining instructions 952 configured for various functions, including, for example, transmitting a set of transmit beams to the UE via a plurality of symbols in a sequential manner, wherein a respective transmit beam in the set of transmit beams is transmitted in a respective symbol of the plurality of symbols, selecting a transmit beam for a data transmission based on a feedback message, and selecting a transmit beam having a highest measured signal strength for a data transmission. For example, the beam refining instructions 952 may be configured to implement one or more of the functions described below in relation to FIG. 10, including, e.g., blocks 1004 and 1008. The computer-readable storage medium 906 may further include feedback processing instructions 954 configured for various functions, including, for example, receiving a feedback message from the UE. For example, the feedback processing instructions 954 may be configured to implement one or more of the functions described below in relation to FIG. 10, including, e.g., block 1006. The computer-readable storage medium 906 may further include data transmitting instructions 956 configured for various functions, including, for example, selecting a transmit beam for a data transmission based on the feedback message, selecting a transmit beam having a highest measured signal strength for a data transmission, transmitting a control message to the UE indicating the selected transmit beam, and transmitting the data transmission to the UE using the selected transmit beam. For example, the data transmitting instructions 956 may be configured to implement one or more of the functions described below in relation to FIG. 10, including, e.g., blocks 1008, 1010, and 1012.

Figure 10:
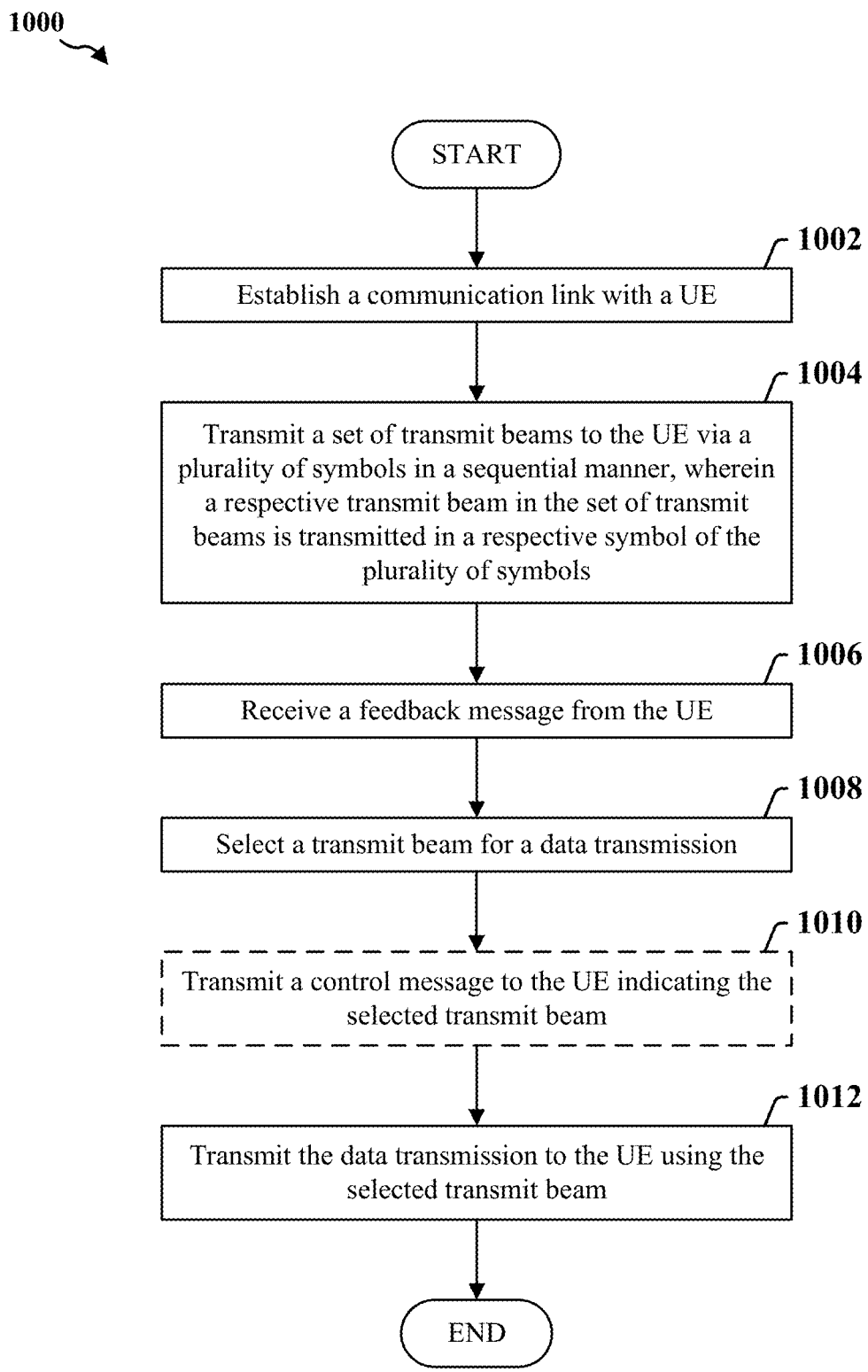
FIG. 10 is a flow chart illustrating an exemplary process for beam management at a base station in accordance with aspects of the present disclosure.

FIG. 10 is a flow chart illustrating an exemplary process 1000 for beam management at a base station (e.g., gNB) in accordance with aspects of the present disclosure. As described below, some or all illustrated features may be omitted in a particular implementation within the scope of the present disclosure, and some illustrated features may not be required for implementation of all aspects. In some examples, the process 1000 may be carried out by the base station 900 illustrated in FIG. 9, which may be a base station or gNB, as illustrated in any one or more of FIGS. 1 and 3-6. In some examples, the process 1000 may be carried out by any suitable apparatus or means for carrying out the functions or algorithm described below.

At block 1002, the base station establishes a communication link with a user equipment (UE).

At block 1004, the base station transmits (e.g., during a beam management/refinement procedure) a set of transmit beams to the UE via a plurality of symbols in a sequential manner That is, the base station transmits a respective transmit beam in the set of transmit beams in a respective symbol of the plurality of symbols. In an aspect, the transmit beams are transmitted to the UE at different angles with respect to each other.

In an aspect, a set of signal strengths (e.g., set of reference signal receive powers (RSRPs)) is measured at the UE for each transmit beam in the set of transmit beams using a plurality of receive beams in the respective symbol. Moreover, a respective signal strength in the set of signal strengths is measured based on a respective receive beam of the plurality of receive beams.

At block 1006, the base station receives a feedback message from the UE. The feedback message includes at least an identification of a transmit beam having a highest measured signal strength (e.g., highest measured signal strength/RSRP among all sets of signal strengths/RSRPs measured for the set of transmit beams at the UE) or an identification of a symbol in which the transmit beam having the highest measured signal strength is transmitted (received at the UE). The feedback message may also include at least the highest measured signal strength. In aspect, the feedback message may further include all sets of signal strengths measured for the set of transmit beams and an identification of a symbol in which a respective transmit beam corresponding to a respective set of signal strengths is transmitted (received at the UE).

At block 1008, the base station selects a transmit beam for a data transmission. In aspect, the base station selects the transmit beam for the data transmission based on the feedback message. Additionally or alternatively, the base station selects the transmit beam having the highest measured signal strength for the data transmission.

At block 1010, the base station optionally transmits a control message to the UE indicating the selected transmit beam. In an aspect, the control message is transmitted via downlink control information (DCI) and/or a medium access channel-control element (MAC-CE). At block 1012, the base station transmits the data transmission to the UE using the selected transmit beam.

In one configuration, the base station 900 for wireless communication includes means for establishing (e.g., link establishing circuitry 940, transceiver 910, and/or antenna array 930) a communication link with a user equipment (UE), means for transmitting (e.g., beam refining circuitry 942, transceiver 910, and/or antenna array 930) a set of transmit beams to the UE via a plurality of symbols in a sequential manner, wherein a respective transmit beam in the set of transmit beams is transmitted in a respective symbol of the plurality of symbols, means for receiving (e.g., feedback processing circuitry 944, transceiver 910, and/or antenna array 930) a feedback message from the UE, means for selecting (e.g., beam refining circuitry 942 and/or data transmitting circuitry 946) a transmit beam for a data transmission based on the feedback message, means for selecting (e.g., beam refining circuitry 942 and/or data transmitting circuitry 946) the transmit beam having the highest measured signal strength for a data transmission, means for transmitting (e.g., data transmitting circuitry 946, transceiver 910, and/or antenna array 930) a control message to the UE indicating the selected transmit beam, and means for transmitting (e.g., data transmitting circuitry 946, transceiver 910, and/or antenna array 930) the data transmission to the UE using the selected transmit beam. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1 and 3-6 and utilizing, for example, the processes and/or algorithms described herein in relation to FIG. 10.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The following provides an overview of aspects of the present disclosure:

Aspect 1: A method of beam management at a user equipment (UE), comprising: establishing a communication link with a base station; receiving a set of transmit beams transmitted from the base station via a plurality of symbols in a sequential manner, wherein a respective transmit beam in the set of transmit beams is received in a respective symbol of the plurality of symbols; and sending a feedback message to the base station, the feedback message comprising at least: an identification of a transmit beam having a highest measured signal strength among all sets of signal strengths measured for the set of transmit beams or an identification of a symbol in which the transmit beam having the highest measured signal strength is received, and the highest measured signal strength.

Aspect 2: The method of aspect 1, wherein the feedback message further comprises: all sets of signal strengths measured for the set of transmit beams; and an identification of a symbol in which a respective transmit beam corresponding to a respective set of signal strengths is received.

Aspect 3: The method of aspect 1 or 2, wherein the receiving the set of transmit beams comprises: measuring, for each transmit beam in the set of transmit beams, a set of signal strengths corresponding to the respective transmit beam using a plurality of receive beams in the respective symbol, wherein a respective signal strength in the set of signal strengths is measured based on a respective receive beam of the plurality of receive beams; detecting the transmit beam having the highest measured signal strength among all sets of signal strengths measured for the set of transmit beams; and identifying the symbol in which the transmit beam having the highest measured signal strength is received.

Aspect 4: The method of any one of aspects 1 through 3, further comprising identifying a receive beam of the plurality of receive beams on which detection of the transmit beam having the highest measured signal strength is based.

Aspect 5: The method of any one of aspects 1 through 4, further comprising receiving a data transmission from the base station using the identified receive beam.

Aspect 6: The method of any one of aspects 1 through 3, further comprising: receiving a control message from the base station, the control message indicating a transmit beam selected for a data transmission based on the feedback message;

identifying a receive beam of the plurality of receive beams yielding a highest measured signal strength for the selected transmit beam; and receiving the data transmission from the base station using the identified receive beam Aspect 7: The method of any one of aspects 1 through 3 and 6, wherein the control message is received via at least one of: downlink control information (DCI); or a medium access channel-control element (MAC-CE).

Aspect 8: The method of any one of aspects 1 through 7, wherein the transmit beams are received from the base station at different angles with respect to each other.

Aspect 9: A user equipment (UE) comprising at least one processor, and a memory coupled to the at least one processor, the at least one processor and the memory configured to perform a method of any one of aspects 1 through 8.

Aspect 10: A user equipment (UE) comprising at least one means for performing a method of any one of aspects 1 through 8.

Aspect 11: A non-transitory computer-readable medium storing code at a user equipment (UE), the code comprising instructions executable by a processor to perform a method of any one of aspects 1 through 8.

Aspect 12: A method of beam management at a base station, comprising: establishing a communication link with a user equipment (UE); transmitting a set of transmit beams to the UE via a plurality of symbols in a sequential manner, wherein a respective transmit beam in the set of transmit beams is transmitted in a respective symbol of the plurality of symbols; and receiving a feedback message from the UE, the feedback message comprising at least: an identification of a transmit beam having a highest measured signal strength or an identification of a symbol in which the transmit beam having the highest measured signal strength is transmitted, and the highest measured signal strength.

Aspect 13: The method of aspect 12, wherein the feedback message further comprises: all sets of signal strengths measured for the set of transmit beams; and an identification of a symbol in which a respective transmit beam corresponding to a respective set of signal strengths is transmitted.

Aspect 14: The method of aspect 12 or 13, further comprising: selecting a transmit beam for a data transmission based on the feedback message; transmitting a control message to the UE indicating the selected transmit beam; and transmitting the data transmission to the UE using the selected transmit beam.

Aspect 15: The method of any one of aspects 12 through 14, wherein the control message is transmitted via at least one of: downlink control information (DCI); or a medium access channel-control element (MAC-CE).

Aspect 16: The method of any one of aspects 12 or 13, further comprising: selecting the transmit beam having the highest measured signal strength for a data transmission; and transmitting the data transmission to the UE using the selected transmit beam.

Aspect 17: The method of any one of aspects 12 through 16, wherein the transmit beams are transmitted to the UE at different angles with respect to each other.

Aspect 18: The method of any one of aspects 12 through 17, wherein a set of signal strengths is measured at the UE for each transmit beam in the set of transmit beams using a plurality of receive beams in the respective symbol, and wherein a respective signal strength in the set of signal strengths is measured based on a respective receive beam of the plurality of receive beams.

Aspect 19: A base station comprising at least one processor, and a memory coupled to the at least one processor, the at least one processor and the memory configured to perform a method of any one of aspects 12 through 18.

Aspect 20: A base station comprising at least one means for performing a method of any one of aspects 12 through 18.

Aspect 21: A non-transitory computer-readable medium storing code at a base station, the code comprising instructions executable by a processor to perform a method of any one of aspects 12 through 18.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of beam management at a user equipment (UE), comprising:
   establishing a communication link with a network node;
   receiving a set of transmit beams transmitted from the network node via a plurality of symbols in a sequential manner, wherein a respective transmit beam in the set of transmit beams is received in a respective symbol of the plurality of symbols,
   wherein the receiving the set of transmit beams includes measuring, for each transmit beam in the set of transmit beams, a set of signal strengths corresponding to the respective transmit beam using a plurality of receive beams in the respective symbol, wherein a respective signal strength in the set of signal strengths is measured based on a respective receive beam of the plurality of receive beams; and
   sending a feedback message to the network node, the feedback message comprising at least:
      an identification of a transmit beam having a highest measured signal strength among all sets of signal strengths measured for the set of transmit beams or an identification of a symbol in which the transmit beam having the highest measured signal strength is received, and
      the highest measured signal strength.

2. The method of claim 1, wherein the feedback message further comprises:
   all sets of signal strengths measured for the set of transmit beams; and
   an identification of a symbol in which a respective transmit beam corresponding to a respective set of signal strengths is received.

3. The method of claim 1, wherein the receiving the set of transmit beams further comprises:
   detecting the transmit beam having the highest measured signal strength among all sets of signal strengths measured for the set of transmit beams; and
   identifying the symbol in which the transmit beam having the highest measured signal strength is received.

4. The method of claim 3, further comprising:
   identifying a receive beam of the plurality of receive beams on which detection of the transmit beam having the highest measured signal strength is based.

5. The method of claim 4, further comprising:
   receiving a data transmission from the network node using the identified receive beam.

6. The method of claim 3, further comprising:
   receiving a control message from the network node, the control message indicating a transmit beam selected for a data transmission based on the feedback message;
   identifying a receive beam of the plurality of receive beams yielding a highest measured signal strength for the selected transmit beam; and
   receiving the data transmission from the network node using the identified receive beam.

7. The method of claim 6, wherein the control message is received via at least one of:
   downlink control information (DCI); or
   a medium access channel-control element (MAC-CE).

8. The method of claim 1, wherein the transmit beams are received from the network node at different angles with respect to each other.

9. A user equipment (UE), comprising:
   at least one processor; and
   a memory coupled to the at least one processor, the at least one processor configured to:
      establish a communication link with a network node,
      receive a set of transmit beams transmitted from the network node via a plurality of symbols in a sequential manner, wherein a respective transmit beam in the set of transmit beams is received in a respective symbol of the plurality of symbols,
      wherein the at least one processor configured to receive the set of transmit beams is configured to measure, for each transmit beam in the set of transmit beams, a set of signal strengths corresponding to the respective transmit beam using a plurality of receive beams in the respective symbol, wherein a respective signal strength in the set of signal strengths is measured based on a respective receive beam of the plurality of receive beams, and
      send a feedback message to the network node, the feedback message comprising at least:
         an identification of a transmit beam having a highest measured signal strength among all sets of signal strengths measured for the set of transmit beams or an identification of a symbol in which the transmit beam having the highest measured signal strength is received, and
         the highest measured signal strength.

10. The UE of claim 9, wherein the feedback message further comprises:
    all sets of signal strengths measured for the set of transmit beams; and
    an identification of a symbol in which a respective transmit beam corresponding to a respective set of signal strengths is received.

11. The UE of claim 9, wherein the at least one processor configured to receive the set of transmit beams is further configured to:
    detect the transmit beam having the highest measured signal strength among all sets of signal strengths measured for the set of transmit beams; and
    identify the symbol in which the transmit beam having the highest measured signal strength is received.

12. The UE of claim 11, wherein the at least one processor is further configured to:
    identify a receive beam of the plurality of receive beams on which detection of the transmit beam having the highest measured signal strength is based.

13. The UE of claim 12, wherein the at least one processor is further configured to:
    receive a data transmission from the network node using the identified receive beam.

14. The UE of claim 11, further comprising:
    a transceiver, wherein the at least one processor is further configured to:
       receive a control message from the network node, the control message indicating a transmit beam selected for a data transmission based on the feedback message,
       identify a receive beam of the plurality of receive beams yielding a highest measured signal strength for the selected transmit beam, and receive the data transmission from the network node using the identified receive beam.

15. The UE of claim 14, wherein the control message is received via at least one of:
  downlink control information (DCI); or
  a medium access channel-control element (MAC-CE).

16. The UE of claim 9, wherein the transmit beams are received from the network node at different angles with respect to each other.

17. A method of beam management at a network node, comprising:
  establishing a communication link;
  transmitting a set of transmit beams via a plurality of symbols in a sequential manner, wherein a respective transmit beam in the set of transmit beams is transmitted in a respective symbol of the plurality of symbols; and
  receiving a feedback message, the feedback message comprising at least:
    all sets of signal strengths measured for the set of transmit beams, wherein a set of signal strengths is measured for each transmit beam in the set of transmit beams using a plurality of receive beams in the respective symbol, and wherein a respective signal strength in the set of signal strengths is measured based on a respective receive beam of the plurality of receive beams,
    an identification of a transmit beam having a highest measured signal strength or an identification of a symbol in which the transmit beam having the highest measured signal strength is transmitted, and
    the highest measured signal strength.

18. The method of claim 17, wherein the feedback message further comprises:
  an identification of a symbol in which a respective transmit beam corresponding to a respective set of signal strengths is transmitted.

19. The method of claim 17, further comprising:
  selecting a transmit beam for a data transmission based on the feedback message;
  transmitting a control message indicating the selected transmit beam; and
  transmitting the data transmission using the selected transmit beam.

20. The method of claim 19, wherein the control message is transmitted via at least one of:
  downlink control information (DCI); or
  a medium access channel-control element (MAC-CE).

21. The method of claim 17, further comprising:
  selecting the transmit beam having the highest measured signal strength for a data transmission; and
  transmitting the data transmission using the selected transmit beam.

22. The method of claim 17, wherein the transmit beams are transmitted at different angles with respect to each other.

23. A network node, comprising:
  at least one processor; and
  a memory coupled to the at least one processor, the at least one processor configured to:
    establish a communication link,
    transmit a set of transmit beams via a plurality of symbols in a sequential manner, wherein a respective transmit beam in the set of transmit beams is transmitted in a respective symbol of the plurality of symbols, and
    receive a feedback message, the feedback message comprising at least:
      all sets of signal strengths measured for the set of transmit beams, wherein a set of signal strengths is measured for each transmit beam in the set of transmit beams using a plurality of receive beams in the respective symbol, and wherein a respective signal strength in the set of signal strengths is measured based on a respective receive beam of the plurality of receive beams,
      an identification of a transmit beam having a highest measured signal strength or an identification of a symbol in which the transmit beam having the highest measured signal strength is transmitted, and
      the highest measured signal strength.

24. The network node of claim 23, wherein the feedback message further comprises:
  an identification of a symbol in which a respective transmit beam corresponding to a respective set of signal strengths is transmitted.

25. The network node of claim 23, further comprising:
  a transceiver, wherein the at least one processor is further configured to:
  select a transmit beam for a data transmission based on the feedback message,
  transmit a control message indicating the selected transmit beam, and
  transmit the data transmission using the selected transmit beam.

26. The network node of claim 25, wherein the control message is transmitted via at least one of:
  downlink control information (DCI); or
  a medium access channel-control element (MAC-CE).

27. The network node of claim 23, wherein the at least one processor is further configured to:
  select the transmit beam having the highest measured signal strength for a data transmission; and
  transmit the data transmission using the selected transmit beam.

28. The network node of claim 23, wherein the transmit beams are transmitted at different angles with respect to each other.

29. A non-transitory computer-readable medium storing code at a user equipment (UE), the code comprising instructions executable by a processor to:
  establish a communication link with a network node;
  receive a set of transmit beams transmitted from the network node via a plurality of symbols in a sequential manner, wherein a respective transmit beam in the set of transmit beams is received in a respective symbol of the plurality of symbols,
  wherein the code comprising instructions executable by the processor to receive the set of transmit beams includes instructions to measure, for each transmit beam in the set of transmit beams, a set of signal strengths corresponding to the respective transmit beam using a plurality of receive beams in the respective symbol, wherein a respective signal strength in the set of signal strengths is measured based on a respective receive beam of the plurality of receive beams; and
  send a feedback message to the network node, the feedback message comprising at least:
    an identification of a transmit beam having a highest measured signal strength among all sets of signal strengths measured for the set of transmit beams or an identification of a symbol in which the transmit beam having the highest measured signal strength is received, and the highest measured signal strength.

30. The non-transitory computer-readable medium of claim 29, wherein the feedback message further comprises:

all sets of signal strengths measured for the set of transmit beams; and an identification of a symbol in which a respective transmit beam corresponding to a respective set of signal strengths is received.

31. The non-transitory computer-readable medium of claim 29, wherein the code comprising instructions executable by the processor to receive the set of transmit beams includes instructions to:

detect the transmit beam having the highest measured signal strength among all sets of signal strengths measured for the set of transmit beams; and identify the symbol in which the transmit beam having the highest measured signal strength is received.

32. The non-transitory computer-readable medium of claim 31, wherein the code further comprises instructions executable by the processor to:

identify a receive beam of the plurality of receive beams on which detection of the transmit beam having the highest measured signal strength is based; and receive a data transmission from the network node using the identified receive beam.

33. A non-transitory computer-readable medium storing code at a network node, the code comprising instructions executable by a processor to:

establish a communication link;

transmit a set of transmit beams via a plurality of symbols in a sequential manner, wherein a respective transmit beam in the set of transmit beams is transmitted in a respective symbol of the plurality of symbols; and receive a feedback message, the feedback message comprising at least:

all sets of signal strengths measured for the set of transmit beams, wherein a set of signal strengths is measured for each transmit beam in the set of transmit beams using a plurality of receive beams in the respective symbol, and wherein a respective signal strength in the set of signal strengths is measured based on a respective receive beam of the plurality of receive beams, an identification of a transmit beam having a highest measured signal strength or an identification of a symbol in which the transmit beam having the highest measured signal strength is transmitted, and the highest measured signal strength.

34. The non-transitory computer-readable medium of claim 33, wherein the feedback message further comprises:

an identification of a symbol in which a respective transmit beam corresponding to a respective set of signal strengths is transmitted.

35. The non-transitory computer-readable medium of claim 33, wherein the code further comprises instructions executable by the processor to:

select a transmit beam for a data transmission based on the feedback message;

transmit a control message indicating the selected transmit beam; and transmit the data transmission using the selected transmit beam.

* * * * *